United States Patent [19]
Takada et al.

[11] Patent Number: 5,859,770
[45] Date of Patent: Jan. 12, 1999

[54] OUTPUT CIRCUIT FOR PWM INVERTER WITH NO FLOATING STATE

[75] Inventors: Kazuyuki Takada, Hirakata; Masahiro Yasohara, Amagasaki; Shinichi Emura, Neyagawa, all of Japan

[73] Assignee: Matsushita Electric Industrial Co., Ltd., Kadoma, Japan

[21] Appl. No.: 804,652

[22] Filed: Feb. 25, 1997

[30] Foreign Application Priority Data

Feb. 26, 1996 [JP] Japan .................................. 8-037693

[51] Int. Cl.⁶ .................... H02M 7/5387; H02M 1/12; H02M 3/24
[52] U.S. Cl. ............................. 363/132; 363/41; 363/98
[58] Field of Search .................... 363/41, 98, 132

[56] References Cited

U.S. PATENT DOCUMENTS

| | | | |
|---|---|---|---|
| 4,777,579 | 10/1988 | Jahns et al. | 363/98 |
| 4,934,822 | 6/1990 | Higaki | 363/41 |
| 5,347,444 | 9/1994 | Takada et al. | 363/98 |
| 5,535,115 | 7/1996 | Kishi et al. | 363/98 |

*Primary Examiner*—Peter S. Wong
*Assistant Examiner*—Bao Q. Vu
*Attorney, Agent, or Firm*—Panitch Schwarze Jacobs & Nadel P.C.

[57] ABSTRACT

An output circuit for a PWM inverter is provided which has an N-type first power device and a P-type second power device. Gates of the first and second power devices are connected to each other. Also, emitters of the first and second power devices are connected to each other. An input electrode control circuit controls the voltage applied to the common gates with respect to the common emitters. The voltage may be a positive or negative value, or zero. The input electrode control circuit controls the conduction states of the two power devices based upon the states of input light emitting devices associated with a first and second photocoupler (current generator). When both of the photocouplers are not lit, no current is generated and the conduction states of the power devices are instantaneously interrupted.

8 Claims, 11 Drawing Sheets

| | |
|---|---|
| MORTOR RELEASE SIGNAL | 156 |
| SWITCHING CONTROL SIGNAL | 42 |
| INVERTED SWITCHING SIGNAL | 80 |
| UPPER ARM SWITCHING SIGNAL | 159 |
| LOWER ARM SWITCHING SIGNAL | 160 |
| UPPER ARM CONTROL SIGNAL | 81 |
| LOWER ARM CONTROL SIGNAL | 82 |
| POWER TRANSISTOR | 70 |
| POWER TRANSISTOR | 71 |
| TERMINAL VOLTAGE OF WINDING | 51 |
| TERMINAL VOLTAGE OF WINDING | 51A |
| TERMINAL VOLTAGE OF WINDING | 51B |

OUTPUT CIRCUIT FOR PWM INVERTER WITH NO FLOATING STATE

BACKGROUND OF THE INVENTION

The present invention relates to an output circuit for a PWM (pulse width modulation) inverter which performs PWM control on the coil voltage of an electric motor.

PWM is an abbreviation for Pulse Width Modulation. The PWM technique is widely used in the field of motor control.

Recently, a PWM inverter rapidly becomes widespread and is widely used in motor control.

FIG. 9 is a block diagram showing the configuration of a usual PWM inverter, and shows an example of a three-phase PWM inverter. In the PWM inverter, generally, the number of output circuits 53 for the PWM inverter varies depending on the phase number of a motor to be controlled, but their fundamental operations are the same with each other.

The configuration of the three-phase PWM inverter will be described with reference to FIG. 9.

First, the fundamental frequency and the effective voltage of a three-phase voltage waveform to be supplied to a motor 60 are set to a frequency voltage setting circuit 58. Next, a PWM control circuit 59 internally generates three-phase PWM signals on the basis of information which is set to the frequency voltage setting circuit 58, and outputs the signals as switching control signals 42, 61, and 62. The switching control signals 42, 61, and 62 are binary signals which respectively instruct that the motor winding terminals 52, 63, and 64 are to be connected to a plus terminal of a main DC power source 14 or a minus terminal thereof. The frequency of the switching control signal 42, 61, or 62 is called a PWM carrier frequency and has a frequency which is usually ten or more times the fundamental frequency of the three-phase voltage waveform which is supplied to the motor 60. Usually, it is often that the fundamental frequency of the three-phase voltage waveform to be supplied to a motor is about 0 to 200 Hz, and the PWM carrier frequency is about 2 to 20 kHz.

A motor release signal 156 is a binary signal which instructs the motor to be set to a free running state or not to be the free running state. The free running state is a state in which all the motor winding terminals 52, 63, and 64 are connected to none of the plus and minus terminals of the main DC power source 14. In a case such as that where a trouble of any kind happens, usually, this state is set so as to protect the motor and a control apparatus.

The output circuits 53 for the PWM inverter are semiconductor switching circuits which control the connection of the motor winding terminal 52, 63, or 64 to the plus or minus terminal of the main DC power source 14 in accordance with the switching control signal 42, 61, or 62. The output circuits 53 are configured so that, when the motor release signal 156 instructs the motor to be set to the free running state, the motor winding terminal 52, 63, or 64 is connected to none of the plus or minus terminal of the main DC power source 14 irrespective of the switching control signal 42, 61, or 62. Usually, the voltage of the main DC power source 14 is often selected to be about DC 140 V which is obtained by rectifying and smoothing AC 100 V, or about DC 280 V which is obtained by rectifying and smoothing AC 200 V.

Hereinafter, the conventional output circuits 53 for the PWM inverter will be described.

FIG. 10 is a circuit diagram showing the configuration of the conventional output circuit 53 for the PWM inverter.

Referring to FIG. 10, a logic inverting circuit 65 inverts positive or negative logic of the switching control signal 42 and outputs an inverted switching signal 80. An AND circuit 157 outputs the result of AND of the motor release signal 156 and the switching control signal 42, as an upper arm switching signal 159. The AND circuit 157 outputs also the result of AND of the motor release signal 156 and the inverted switching signal 80, as a lower arm switching signal 160. On-delay circuits 66 and 67 output upper and lower arm control signals 81 and 82 which are obtained by delaying rise edges of the upper and lower arm switching signals 159 and 160 by an on-delay time TD, respectively.

A base drive circuit 68 causes a power transistor 70 to be turned ON or OFF in accordance with the upper arm control signal 81. A base drive circuit 69 causes a power transistor 71 to be turned ON or OFF in accordance with the lower arm control signal 82. Specifically, when the upper arm control signal 81 is in 'H' level, the output transistor of a photocoupler 72 is turned ON. This causes a transistor 74 to be turned ON, so that a transistor 76 is turned OFF, thereby turning ON the power transistor 70. By contrast, when the upper arm control signal 81 is in 'L' level, the output transistor of the photocoupler 72 is turned OFF. This causes the transistor 74 to be turned OFF, so that the transistor 76 is turned ON, thereby turning OFF the power transistor 70.

A base drive circuit 69 operates in the strictly same manner as the base drive circuit 68.

Other examples of the base drive circuits 68 and 69 are disclosed in, for example, Japanese utility model unexamined publication No. SHO 57-42589 and Japanese patent unexamined publication No. SHO 59-178980. These examples basically operate in the same manner as the base drive circuits 68 and 69 shown in FIG. 10 and may be replaced with the circuits.

Hereafter, description is made as to operation of the output circuit 53 for the PWM inverter configured above.

First, the case where the motor release signal 156 is in 'L' level, namely instructs the motor to be set to the free running state will be considered. Then it will be found that both the power transistors 70 and 71 are in the OFF state irrespective of the level of the switching control signal 42 or in both the cases where the signal is in 'L' level and where the signal is in 'H' level.

Hereinafter,, the case where the motor release signal 156 is in 'H' level or instructs the motor not to be the free running state will be described.

FIG. 11 is a waveform chart showing signals in the output circuit 53 for the PWM inverter of FIG. 10. When the switching control signal 42 is changed from 'L' level to 'H' level, the on-delay circuit 66 changes the upper arm control signal 81 from 'L' level to 'H' level with a time delay of the on-delay time TD from the change of the switching control signal 42. When the upper arm control signal 81 is changed to 'H' level, the power transistor 70 is turned ON. There exists an operation delay time TX1 between the operations of the base drive circuit 68 and the power transistor 70. The operation delay time TX1 varies depending on changes of temperature of the power transistor 70 and the value of the current passing through the collector, and also on variations and aging of components constituting the base drive circuit 68 and the power transistor 70.

When the switching control signal 42 is changed from 'L' level to 'H' level, the inverted switching signal 80 is changed from 'H' level to 'L' level, and the on-delay circuit 67 changes the lower arm control signal 82 to 'L' level with a substantially no time delay. When the lower arm control signal 82 is changed to 'L' level, the power transistor 71 is turned OFF. There exists an operation delay time TY2 between the operations of the base drive circuit 69 and the power transistor 71. The operation delay time TY2 varies depending on changes of temperature of the power transistor 71 and the value of the current passing through the collector, and also on variations and aging of components constituting the base drive circuit 69 and the power transistor 71.

When the switching control signal 42 is then changed from 'H' level to 'L' level, the on-delay circuit 66 changes the upper arm control signal 81 to 'L' level with a substantially no time delay, so that the power transistor 70 is turned OFF. There exists an operation delay time TY1 between the operations of the base drive circuit 68 and the power transistor 70.

When the switching control signal 42 is changed from 'H' level to 'L' level, the inverted switching signal 80 is changed from 'L' level to 'H' level, and the on-delay circuit 67 changes the lower arm control signal 82 from 'L' level to 'H' level with the time delay TD. When the lower arm control signal 82 is changed to 'H' level, the power transistor 71 is turned ON. There exists an operation delay time TX2 between the operations of the base drive circuit 69 and the power transistor 71.

When the operation delay time TX1 or TX2 is compared with the operation delay time TY1 or TY2, usually, the operation delay time TY1 or TY2 tends to be longer than the operation delay time TX1 or TX2. Provided that, considering the worst conditions, the smallest value of the operation delay times TX1 and TX2 is indicated by TXW and the longest value of the operation delay times TY1 and TY2 is indicated by TYW, the on-delay time TD is usually set to have a value which is the sum of a small margin and a value obtained by subtracting TXW from TYW.

In the case where bipolar power transistors are used, the on-delay time TD is set to be about 10 to 50 microseconds. In the case where IGBTs (Insulated gate bipolar transistor) are used, the on-delay time TD is set to be about 5 to 30 microseconds, and, in the case where power MOS-FETs are used, set to be about 2 to 10 microseconds. When the switching control signal 42 is changed from 'H' level to 'L' level or from 'L' level to 'H' level, the on-delay time prevents the power transistors 70 and 71 from being simultaneously turned ON so as to short-circuit the plus and minus terminals of the main DC power source 14.

Then the states of the switching control signal 42 and a motor winding terminal voltage 51 will be considered. When the switching control signal 42 is fixed to 'L' level, the power transistor 71 is in the ON-state under the state where the power transistor 70 is turned OFF. Therefore, the motor winding terminal 52 is connected to the minus terminal of the main power source 14. When the switching control signal 42 is fixed to 'H' level, the power transistor 71 is in the OFF-state under the state where the power transistor 70 is turned ON. Therefore, the motor winding terminal 52 is connected to the plus terminal of the main power source 14.

In the above-described configuration of the prior art, when the switching control signal 42 is changed from 'L' level to 'H' level or vice versa in the case where the motor release signal 156 is in 'H' level or instructs the motor not to be the free running state, both the power transistors 70 and 71 are in the OFF-state for a certain time period. This causes a control error in voltage control of the motor winding terminal 52. The control error produces problems in that the torque and the rotational speed of the motor are varied and that noises and vibrations of the motor are increased in level.

These problems will be described in more detail.

Referring to FIG. 10 and FIG. 11, when the switching control signal 42 is changed from 'L' level to 'H' level or vice versa, a power transistor which has been in the ON-state is first turned OFF and that which has been in the OFF-state is then turned ON. During a time period, therefore, both the power transistors 70 and 71 are in the OFF-state. This state is called the floating state, and this time period is called the floating time period TZ. Usually, the floating time period TZ is often about ½ to ⅔ of the on-delay time TD.

Originally, in the PWM control of a motor, for example, the motor winding terminal 52 is alternatingly connected to the plus and minus terminals of the main DC power source 14. The average voltage of the motor winding terminal 52 is controlled in accordance with the ratio of the period when the winding terminal is connected to the plus terminal to the period when the winding terminal is connected to the minus terminal. Ideally speaking, when the voltage of the main DC power source 14 is fixed, the average voltage of the motor winding terminal 52 is uniquely controlled in accordance with the time ratio of 'H' level to 'L' level of the switching control signal 42.

In the prior art output circuit for the PWM inverter, however, there exists the floating state and hence the average voltage of the motor winding terminal 52 is varied depending on the direction of the current flowing through the motor winding terminal 52. Specifically, when the floating state is established under the state where the current flows in the direction along which the current flows from the motor winding terminal 52 into the output circuit 53 for the PWM inverter, a diode 78 conducts and hence the state where the motor winding terminal 52 is connected to the plus terminal of the main DC power source 14 is produced. This state is indicated by a terminal voltage 51A of motor winding in FIG. 11. By contrast, when the current flows in the direction along which the current flows from the output circuit 53 for the PWM inverter into the motor winding terminal 52 under the floating state, a diode 79 conducts, and hence the state where the motor winding terminal 52 is connected to the minus terminal of the main DC power source 14 is produced. This state is indicated by a terminal voltage 51B of motor winding in FIG. 11. When no current flows through the motor winding terminal 52 under the floating state, the voltage of the motor winding terminal 52 is determined by voltages such as an induced voltage generated in the motor 60.

As described above, the existence of the floating state causes the average voltage of the motor winding terminal 52 not to be uniquely determined by the switching control signal 42, thereby producing a control error. Usually, since the current passing through the motor winding terminal 52 is an alternating current and changed in the direction, the control error is also changed depending on the change of the direction of current, and thereby the torque and the rotational speed of the motor 60 are varied. This problem can be solved by eliminating the floating state and making the floating time period zero. In the conventional output circuit for the PWM inverter, however, a short circuit between the plus and minus terminals of the main power source 14 occurs and hence it is practically impossible to solve the problem.

Furthermore, when the power transistor is turned ON or OFF, electric noise is produced. In a use wherein such electric noise should be reduced in level, particularly, the switching speed is sometimes lowered by, for example, a method in which a capacitor is connected across the base and the emitter of the power transistor. However, this countermeasure increases variations of the operation delay times TX1, TX2, TY1, and TY2 to a very large value, whereby the floating time is inevitably further prolonged. Therefore, the control error is increased, with the result that the switching speed cannot be largely lowered.

Other conventional output circuits for the PWM inverter are used in which the power transistors 70 and 71 of FIG. 10 are replaced with power MOS-FETs, respectively, or in which the power transistors are replaced with IGBTs, respectively. However, also these circuits operate in the same manner as the conventional output circuit for the PWM inverter shown in FIG. 10 and has the floating state.

BRIEF SUMMARY OF THE INVENTION

It is an object of the present invention to solve the above-discussed problems and provide an output circuit for a PWM inverter of small power consumption at a low cost in which the floating state is intrinsically eliminated so that the floating time period is zero, the average voltage of a motor winding terminal can be uniquely determined by a switching control signal, thereby preventing a control error from being produced, and, when the free running state is to be set, the motor winding terminal can be instantaneously released from a main DC power source.

In order to attain the object, the output circuit for the PWM inverter of an aspect of the invention comprises: a main DC power source; a first power device which is of an N-type, which has an input electrode, a reference electrode, and an output electrode, and in which, when the input electrode is positive in voltage with respect to the reference electrode, a conduction state between the output electrode and the reference electrode is established; and a second power device which is of a P-type, which has an input electrode, a reference electrode, and an output electrode, and in which, when the input electrode is negative in voltage with respect to the reference electrode, a conduction state between the output electrode and the reference electrode is established. The reference electrode of the first power device and the reference electrode of the second power device constitute a common reference electrode, and the input electrode of the first power device and the input electrode of the second power device constitute a common input electrode.

The output circuit for the PWM inverter further comprises: input electrode controlling means for controlling a voltage of the common input electrode with respect to the common reference electrode of the first and second power devices, to be a positive or negative value, or a value of approximately zero; a first photocoupler; and a second photocoupler. When an input light emitting device of the first photocoupler is in a lighting state and an input light emitting device of the second photocoupler is in a nonlighting state, the input electrode controlling means controls the voltage of the common input electrode with respect to the common reference electrode of the first and second power devices, to be a positive value. When the input light emitting device of the first photocoupler is in a nonlighting state and the input light emitting device of the second photocoupler is in a lighting state, the input electrode controlling means controls the voltage of the common input electrode with respect to the common reference electrode of the first and second power devices, to be a negative value.

The circuit is configured so that, when the input light emitting device of the first photocoupler and the input light emitting device of the second photocoupler are in a nonlighting state, the input electrode controlling means controls the voltage of the common input electrode with respect to the common reference electrode of the first and second power devices to be approximately zero, thereby interrupting the conduction state between the output electrode and the reference electrode of the first power device, and the conduction state between the output electrode and the reference electrode of the second power device.

As a result, an excellent output circuit for a PWM inverter of small power consumption can be provided at a low cost. In the output circuit, the floating state is intrinsically eliminated so that the floating time period is zero, the average voltage of a motor winding terminal can be uniquely determined by a switching control signal, thereby reducing a control error to a very low level, and, when the free running state is to be set, the motor winding terminal can be instantaneously released from the main DC power source, thereby enabling the output power to be increased. As required, furthermore, an excellent output circuit for a PWM inverter which produces electric noises at a very low level can be provided at a low cost.

When both the input light emitting devices of the first and second photocouplers are in a nonlighting state, particularly, the input electrode controlling means controls the voltage of the common input electrode with respect to the common reference electrode of the first and second power devices to be approximately zero, thereby interrupting the conduction states of the first and second power devices. Even in the case of an abnormal state of the power source such as a power failure in which the circuit portions unstably operate, therefore, it is possible to surely protect an apparatus.

The input electrode controlling means is configured in such a manner that the conduction states of the first and second power devices are instantaneously interrupted, and therefore, the possibility of producing heat generation and breakage due to an increased power loss which causes a problem in the case of using a power device of a larger current capacity is eliminated, so that the output power is safely increased.

The output circuit for the PWM inverter of another aspect of the invention comprises: a main DC power source; a first power device which is of an N-type, which has an input electrode, a reference electrode, and an output electrode, and in which, when the input electrode is positive in voltage with respect to the reference electrode, a conduction state between the output electrode and the reference electrode is established; and a second power device which is of a P-type, which has an input electrode, a reference electrode, and an output electrode, and in which, when the input electrode is negative in voltage with respect to the reference electrode, a conduction state between the output electrode and the reference electrode is established. The reference electrode of the first power device and the reference electrode of the second power device constitutes a common reference electrode, and the input electrode of the first power device and the input electrode of the second power device constitutes a common input electrode. The abovementioned first and second power devices are insulated gate bipolar transistors (IGBT).

The output circuit for the PWM inverter further comprises: input electrode controlling means for controlling a voltage of the common input electrode with respect to the common reference electrode of the first and second power devices, to be a positive or negative value, or a value of approximately zero; first current generating means; and second current generating means. When the first current generating means generates a current and a current generated by the second current generating means is approximately zero, the input electrode controlling means controls the voltage of the common input electrode with respect to the common reference electrode of the first and second power devices, to be a positive value. When a current generated by the first current generating means is approximately zero and the second current generating means generates a current, the input electrode controlling means controls the voltage of the common input electrode with respect to the common reference electrode of the first and second power devices, to be a negative value.

The circuit is configured so that, when currents respectively generated by the first and second current generating means are approximately zero, the input electrode controlling means controlling the voltage of the common input electrode with respect to the common reference electrode of the first and second power devices, to be approximately zero, thereby interrupting the conduction state between the output electrode and the reference electrode of the first power device, and the conduction state between the output electrode and the reference electrode of the second power device.

Therefore, an excellent output circuit for a PWM inverter of small power consumption can be provided at a low cost. In the output circuit, the floating state is intrinsically eliminated so that the floating time period is zero, the average voltage of a motor winding terminal can be uniquely determined by a switching control signal, thereby reducing a control error to a very low level, and, when the free running state is to be set, the motor winding terminal can be instantaneously released from the main DC power source, thereby enabling the output power to be increased. As required, furthermore, an excellent output circuit for a PWM inverter which produces electric noises at a very low level can be provided at a low cost.

When currents respectively generated by the first and second current generating means are zero, particularly, the input electrode controlling means controls the voltage of the common input electrode with respect to the common reference electrode of the first and second power devices, to be approximately zero, thereby interrupting the conduction states of the first and second power devices. Even in the case of an abnormal state of the power source such as a power failure in which the circuit portions unstably operate, therefore, it is possible to surely protect an apparatus.

The input electrode controlling means is configured in such a manner that the conduction states of the first and second power devices are instantaneously interrupted. Therefore, the possibility of producing heat generation and breakage due to an increased power loss which causes a problem in the case of using a power device of a larger current capacity is eliminated, so that the output power is safely increased.

Since IGBTs which are power devices are controlled by the first and second current generating means, the circuit is more resistant to heat than that using photocouplers, and hence more advantageous also in application in a wider temperature range.

According to this configuration, the first and second power devices are intrinsically prevented from being simultaneously turned ON. Consequently, the present circuit can assure safety.

DETAILED DESCRIPTION OF THE INVENTION

Hereinafter, embodiments of the invention will be described with reference to FIG. 1 to FIG. 8.

[First embodiment]

Figure 1:
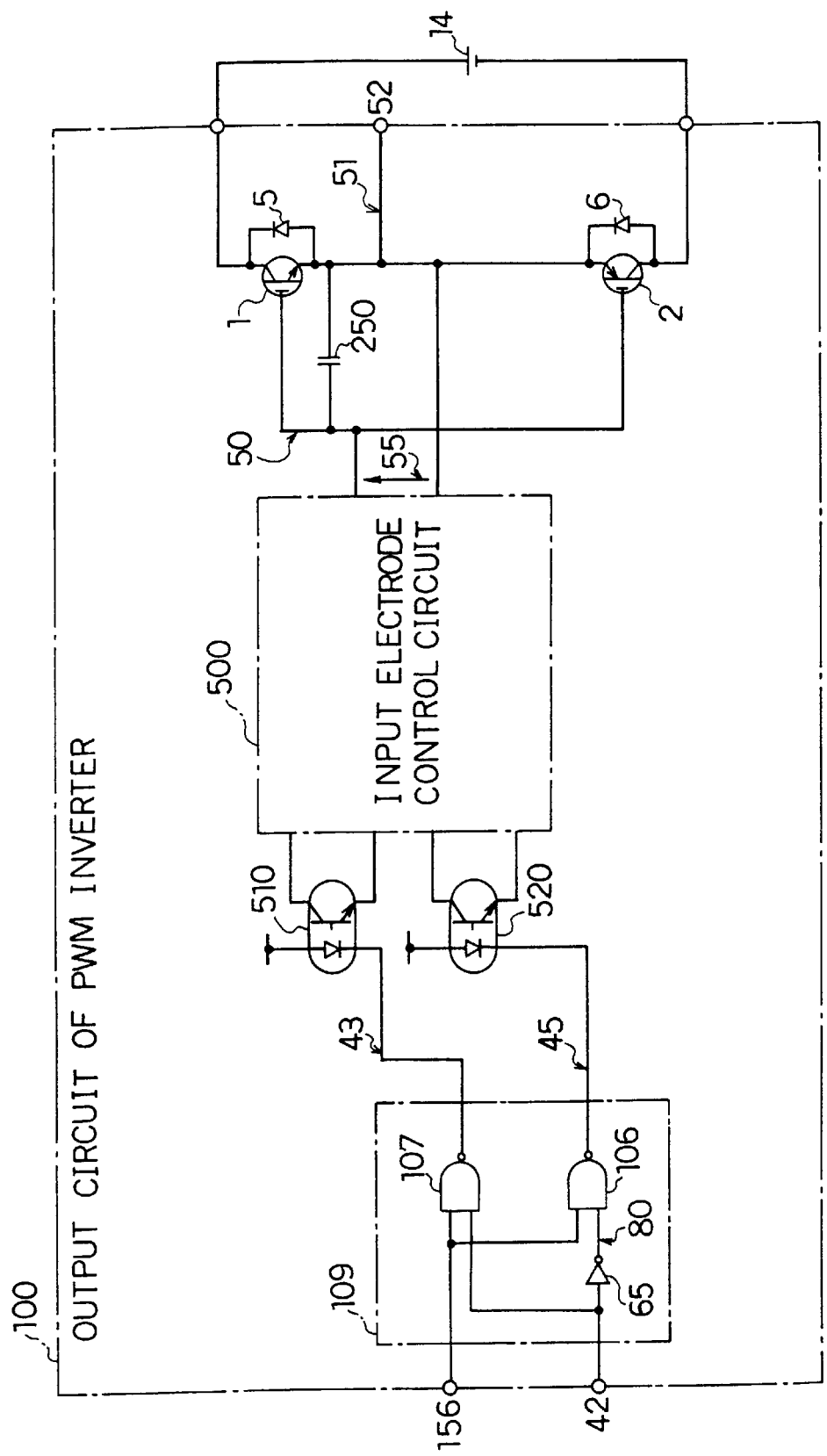
FIG. 1 is a diagram showing the configuration of an output circuit for a PWM inverter of a first embodiment of the invention.

FIG. 1 is a diagram showing the configuration of an output circuit 100 for a PWM inverter which is a first embodiment of the invention.

Referring to FIG. 1, a first power device 1 which is of an N-type or an N-channel type, and a second power device 2 which is of a P-type or a P-channel type are configured by IGBTs (insulated gate bipolar transistors), power MOSFETs, or the like.

FIG. 1 shows the case where the first and second power devices 1 and 2 are the IGBTs. In the following description, the power devices 1 and 2 are called IGBTs 1 and 2, respectively.

The emitters of the first IGBT 1 and the second IGBT 2 are connected to each other. The emitters work as respective reference electrodes having reference potentials with respect to the respective gates. The gate, which is the input electrode, of the first IGBT 1, and the gate, which is the input electrode, of the second IGBT 2 are connected to each other.

Between the collectors which are the output electrodes of the first and second IGBTs 1 and 2 and the emitters which are the reference terminals, diodes 5 and 6 are connected in reverse parallel with respect to the conduction directions of the respective IGBTs.

One output terminal of an input electrode control circuit 500 which is the input electrode controlling means is connected to the common gate of the first and second IGBTs 1 and 2, and the other output terminal is connected to the common emitter of the first and second IGBTs 1 and 2.

The outputs of first and second photocouplers 510 and 520 are supplied to the input electrode control circuit 500.

The output of a signal processing circuit 109 is connected so as to drive the input light emitting devices of the first and second photocouplers 510 and 520.

A capacitor 250 is connected between the common gate and the common emitter of the first and second IGBTs 1 and 2.

The positive electrode of a main DC power source 14 is connected to the collector of the IGBT 1, and the negative electrode is connected to the collector of the second IGBT 2.

[Operation of the first embodiment]

The operation of the thus configured output circuit for a PWM inverter will be described with reference to FIGS. 1 and 2.

A logic inverting circuit 65 inverts the logic of a switching control signal 42 and outputs the inversion result as an inverted switching signal 80.

A NAND circuit 106 outputs the NAND of a motor release signal 156 and the inverted switching signal 80. A NAND circuit 107 outputs the NAND of the motor release signal 156 and the switching control signal 42.

The logic inverting circuit 65, and the NAND circuits 106 and 107 constitute the signal processing circuit 109.

First, the case where the motor release signal 156 is in 'H' level or instructs the motor not to be the free running state will be described. Thereafter, the case where the motor release signal 156 is in 'L' level or instructs the motor to be the free running state will be described.

A control signal 43 for the input light emitting device of the first photocoupler 510 is generated by passing the switching control signal 42 through the NAND circuit 107. The control signal 43 is approximately identical with the inversion of the switching control signal 42. For example, 'L' level of a signal is 0 V and 'H' level is 5 V.

On the other hand, the anode terminal of the input light emitting device of the first photocoupler 510 is biased to 'H' level of, for example, 5 V. The cathode terminal of the device is controlled by the control signal 43.

When the switching control signal 42 is in 'L' level, therefore, the control signal 43 is in 'H' level, so that the input light emitting device of the first photocoupler 510 is not lit and the output transistor of the photocoupler is turned OFF. When the switching control signal 42 is in 'H' level, the control signal 43 is in 'L' level, so that the input light emitting device of the first photocoupler 510 is lit and the output transistor of the photocoupler is turned ON.

A control signal 45 for the input light emitting device of the second photocoupler 520 is generated by passing the switching control signal 42 through the logic inverting circuit 65 and the NAND circuit 106. The control signal 45 is approximately identical with the switching control signal 42. For example, 'L' level of the signal is 0 V and 'H' level is 5 V.

On the other hand, the anode terminal of the input light emitting device of the second photocoupler 520 is biased to 'H' level of, for example, 5 V. The cathode terminal of the device is controlled by the control signal 45.

When the switching control signal 42 is in 'L' level, therefore, the control signal 45 is in 'L' level, so that the input light emitting device of the second photocoupler 520 is lit and the output transistor of the photocoupler is turned ON. When the switching control signal 42 is in 'H' level, the control signal 45 is in 'H' level, so that the input light emitting device of the second photocoupler 520 is not lit and the output transistor of the photocoupler is turned OFF.

The input electrode control circuit 500 operates so as to control a voltage shown by an arrow 55 (hereinafter is referred to as voltage 55) of the common gate with respect to the common emitter of the first and second IGBTs 1 and 2 in accordance with the ON or OFF state of the output transistors of the first and second photocouplers 510 and 520.

In other words, when the output transistor of the first photocoupler 510 is turned ON and that of the second photocoupler 520 is turned OFF, the voltage 55 of the common gate with respect to the common emitter of the IGBTs 1 and 2 is controlled so as to have a positive value. When the output transistor of the first photocoupler 510 is turned OFF and that of the second photocoupler 520 is turned ON, the voltage 55 of the common gate with respect to the common emitter of the IGBTs 1 and 2 is controlled so as to have a negative value.

The operation from input of the switching control signal 42 to output of the voltage 55 of the input electrode control circuit 500 will be summarized. When the switching control signal 42 is in 'H' level, the input light emitting device of the first photocoupler 510 is in the lighting state and that of the second photocoupler 520 is in the nonlighting state. Consequently, the voltage 55 of the common gate with respect to the common emitter of the IGBTs 1 and 2 has a positive value.

When the switching control signal 42 is in 'L' level, the input light emitting device of the first photocoupler 510 is in the nonlighting state and that of the second photocoupler 520 is in the lighting state. Consequently, the voltage 55 of the common gate with respect to the common emitter of the IGBTs 1 and 2 has a negative value.

In this way, the voltage 55 of the common gate with respect to the common emitter of the IGBTs 1 and 2 is controlled in accordance with the switching control signal 42.

The positive value of the voltage 55 of the common gate with respect to the common emitter of the IGBTs 1 and 2 must be a voltage at which the first IGBT 1 can be sufficiently turned ON and the second IGBT 2 can be sufficiently turned OFF, and a value which does not exceed an withstand voltage across the gate and the emitter of each of the first and second IGBTs 1 and 2.

The negative value of the voltage 55 of the common gate with respect to the common emitter of the IGBTs 1 and 2 must be a voltage at which the second IGBT 2 can be sufficiently turned ON and the first IGBT 1 can be sufficiently turned OFF, and a value which does not exceed the withstand voltage across the gate and the emitter of each of the first and second IGBTs 1 and 2.

Usually, in many N-channel IGBTs, the withstand voltage across the gate and the emitter is about ±20 to ±30 V, and a gate threshold voltage at which the conduction state between the collector and the emitter is established is about +1 to +5 V with respect to the emitter voltage. In many P-channel IGBTs, the withstand voltage across the gate and the emitter is about ±20 to ±30 V, and the gate threshold voltage at which the conduction state between the collector and the emitter is established is about −1 to −5 V with respect to the emitter voltage.

Next, the operations of the first and second IGBT 1 and 2 will be described. The gates of the first and second IGBTs 1 and 2 are connected to each other and the emitters of the IGBTs 1 and 2 are also connected to each other. When the gate signal voltage 50 becomes higher than the motor winding terminal voltage 51 by a value which is equal to or larger than the gate threshold voltage of the first IGBT 1, therefore, the second IGBT 2 is turned OFF and the current begins to flow from the collector of the first IGBT 1 to the emitter. By contrast, when the gate signal voltage 50 becomes lower than the motor winding terminal voltage 51 by a value which is equal to or larger than the gate threshold voltage of the second IGBT 2, the first IGBT 1 is turned OFF and the current begins to flow from the emitter of the second IGBT 2 to the collector. Therefore, it is intrinsically impossible that the first and second IGBTs 1 and 2 simultaneously allow a current to pass therethrough, and the plus and minus terminals of the main DC power source 14 are short-circuited.

The potential difference between the gate signal voltage 50 and the motor winding terminal voltage 51 is controlled as the voltage 55 by the input electrode control circuit 500. Specifically, the potential difference is controlled so as to be within a fixed range where the IGBTs 1 and 2 can be turned ON or OFF safely and surely without exceeding the withstand voltage of the IGBTs 1 and 2.

Next, the operations of the diodes 5 and 6 will be described. Usually, a simple equivalent circuit of a motor winding is indicated as a series circuit of a resistor, an inductance and a voltage source corresponding to an induced voltage. Unlike a pure resistance load, therefore, the direction of the current flowing through the motor winding terminal 52 is not uniquely determined by the voltage applied to the motor winding terminal 52. The state of the current is one of the following four states A, B, C, and D:

state A where the first IGBT 1 is turned ON, the second IGBT 2 is turned OFF, and the current flows from the motor winding terminal 52 to the motor;

state B where the first IGBT 1 is turned ON, the second IGBT 2 is turned OFF, and the current flows from the motor to the motor winding terminal 52;

state C where the first IGBT 1 is turned OFF, the second IGBT 2 is turned ON, and the current flows from the motor to the motor winding terminal 52; and state D where the first IGBT 1 is turned OFF, the second IGBT 2 is turned ON, and the current flows from the motor winding terminal 52 to the motor.

In the state A, it will be seen that the current flowing through the motor winding terminal 52 passes through the first IGBT 1. In the state C, it will be seen that the current flowing through the motor winding terminal 52 passes through the second IGBT 2. In the states B and D, it will be seen that the current flowing through the motor winding terminal 52 passes through the diode 5 or 6. The motor winding terminal voltage 51 in the state B is raised by the current flowing through the motor winding terminal 52 and fixed at the timing when the diode 5 conducts. When the reverse recovery time "trr" of the diode 5 is long, a switching loss is increased. Therefore, it is preferable to select a diode having a short reverse recovery time as the diode 5. Similarly, the motor winding terminal voltage 51 in the state D is lowered by the current flowing through the motor winding terminal 52 and fixed at the timing when the diode 6 conducts. When the reverse recovery time "trr" of the diode 6 is long, the switching loss is increased. Therefore, it is preferable to select as the diode 6 a diode having a reverse recovery time as short as possible.

From the above description, it will be seen that, when the switching control signal 42 is in 'H' level, the motor winding terminal 52 is connected to the plus terminal of the main DC power source 14. By contrast, when the switching control signal 42 is in 'L' level, the motor winding terminal 52 is connected to the minus terminal of the main DC power source 14. Also when the switching control signal 42 is changed from 'H' level to 'L' level or vice versa, therefore, the floating time period is intrinsically zero.

Rise and fall times of the motor winding terminal voltage 51 can be adjusted by connecting the capacitor 250 across the common gate and the common emitter of the first and second IGBTs 1 and 2 in FIG. 1.

As the rise and fall times of the motor winding terminal voltage 51 are shorter, usually, the power losses of the first and second IGBTs 1 and 2 and the like are reduced. Therefore, it is preferable to shorten the rise and fall times. However, this produces a drawback that electric noises are raised in level. Consequently, the use of the capacitor 250 is effective in the case where the rise and fall times of the motor winding terminal voltage 51 are particularly prolonged so that the electric noise level is lowered.

In the above, the description has been made as to the cases where the motor release signal 156 is in 'H' level or instructs the motor not to be the free running state. Next, description will be made as to the cases where the motor release signal 156 is in 'L' level or instructs the motor to be the free running state.

Figure 2:
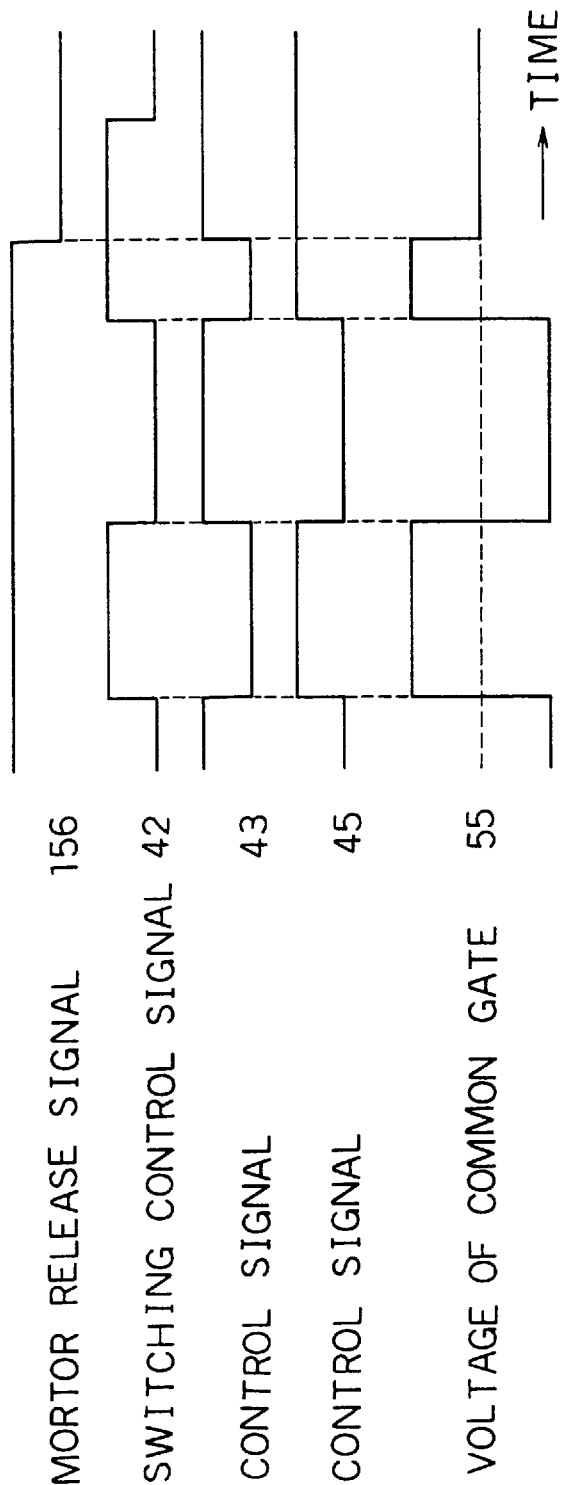
FIG. 2 is a view showing the operation of the output circuit for the PWM inverter of the first embodiment of the invention.

Referring to FIG. 2, when the motor release signal 156 is in 'L' level or instructs the motor to be the free running state, both the output signals of the NAND circuits 106 and 107 are in 'H' level irrespective of the switching control signal 42, and hence both the control signals 43 and 45 of the input lighting elements of the first and second photocouplers 510 and 520 are in 'H' level.

At this time, both the input lighting elements of the first and second photocouplers 510 and 520 are not lit, and the output transistors of the photocouplers are turned OFF.

The input electrode control circuit 500 is configured so as to, under this state, control the voltage 55 of the common gate with respect to the common emitter of the IGBTs 1 and 2 to have a value which is not higher than the gate threshold voltages of the IGBTs 1 and 2 or approximately 0 V (for example, a voltage of about −1 to ±1 V).

In order to set the voltage 55 across the common emitter and the common gate of the IGBTs 1 and 2 to be 0 V, the charges accumulated in the static capacitances included in the IGBTs 1 and 2 and the capacitor 250 must be discharged. To comply with this, the input electrode control circuit 500 is configured so as to discharge these charges for a very short time period.

When both the input lighting elements of the first and second photocouplers 510 and 520 are not lit, therefore, the gate signal voltage 50 of the first and second IGBTs 1 and 2 instantaneously reaches a potential which is substantially equal to that of the motor winding terminal voltage 51. As a result, both the first and second IGBTs 1 and 2 are instantaneously turned OFF and the free running state is attained.

The free running state is used for interrupting the operation of the motor when any trouble occurs, thereby protecting the motor and the control apparatus.

Also in the case of an abnormal state of the power source such as a power failure, particularly, the motor and the control apparatus can be surely protected by configuring the circuit so that the IGBTs 1 and 2 are interrupted, when both the input lighting elements of the first and second photocouplers 510 and 520 are not lit.

When a power failure occurs, the voltage of a DC power source (not shown) which generates a bias voltage for the anodes of the input lighting elements of the first and second photocouplers 510 and 520 and which serves as a power source for operating the signal processing circuit 109 is rapidly lowered.

When the voltage of the DC power source is lowered, operations of the signal processing circuit 109 and the like become unstable. However, the input lighting elements of the first and second photocouplers 510 and 520 are certainly caused not to be lit, with the reduction of the voltage of the DC power source which is the supply source of a bias voltage for the input lighting elements.

The input electrode control circuit 500 is configured so that, when the input lighting elements of the first and second photocouplers 510 and 520 are not lit, the voltage of the common gate with respect to the common emitter of the IGBTs 1 and 2 is rapidly set to be approximately 0 V. When the input electrode control circuit 500 operates, therefore, the IGBTs 1 and 2 are instantaneously interrupted.

As mentioned above, when the input lighting elements of the first and second photocouplers 510 and 520 are not lit, the input electrode control circuit 500 sets the voltage 55 of the common gate with respect to the common emitter of the IGBTs 1 and 2 to be approximately 0 V, whereby, the apparatus can be surely protected even in the case of a power failure in which operations of the circuits become unstable.

In the case where a three-phase motor is driven in such a manner that a current supply is performed during a period of 120 degrees in electric angle and not performed during a period of 60 degrees, the free running state is used also for providing a current-supply halting phase in which a current supply to one predetermined phase is not performed.

Figure 3:
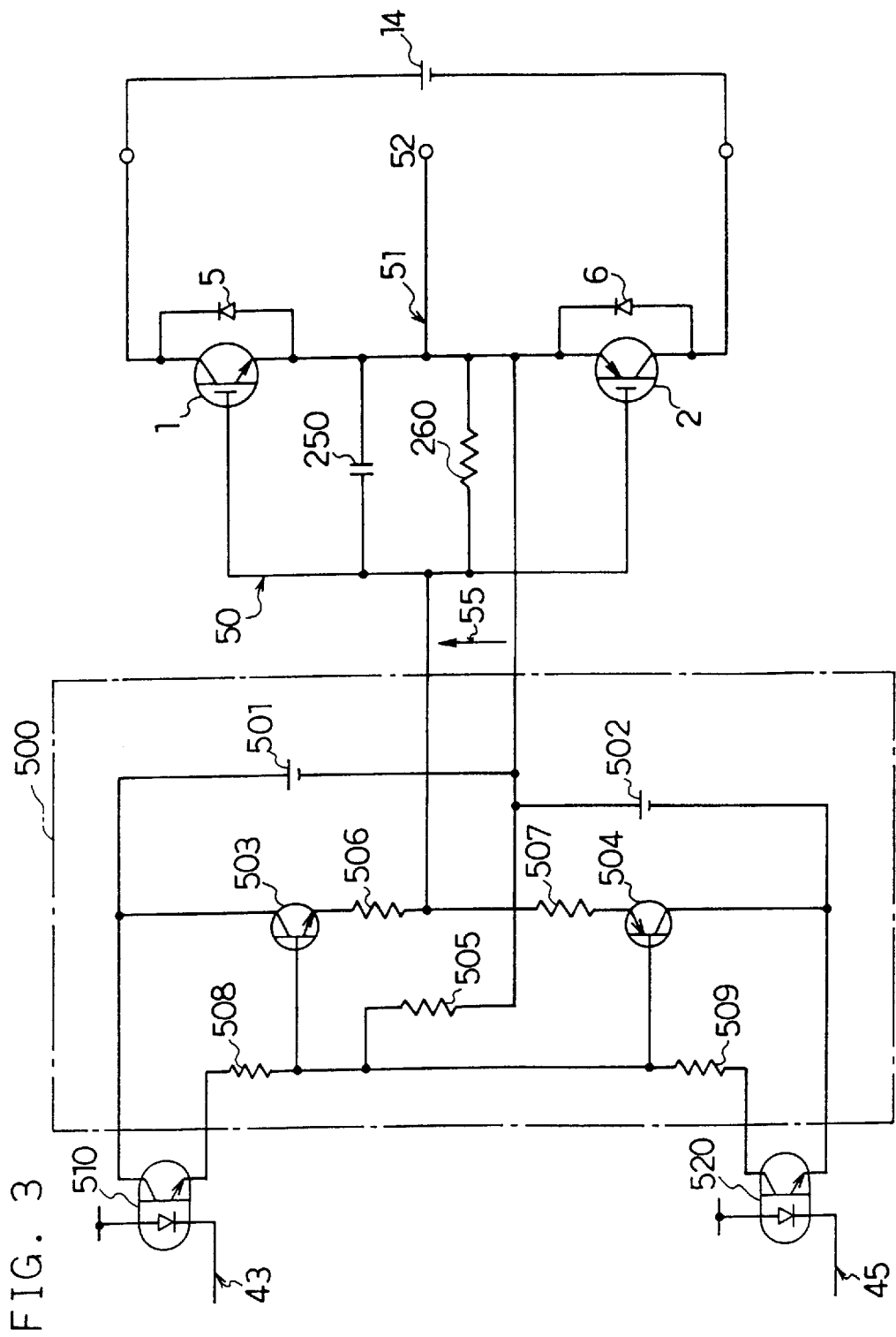
FIG. 3 is a circuit diagram of input electrode controlling circuit of the first embodiment of the invention.

FIG. 3 shows an example of the configuration of the input electrode control circuit 500.

Hereinafter, the input electrode control circuit 500 shown in FIG. 3 will be described.

First, the case where the motor release signal 156 is in 'H' level or instructs the motor not to be the free running state will be described.

In this case, when the switching control signal 42 is in 'H' level, the input light emitting device of the first photocoupler 510 is caused to be lit by the control signal 43, and the output transistor of the photocoupler is turned ON. The input light emitting device of the second photocoupler 520 is caused not to be lit by the control signal 45, and the output transistor of the photocoupler is turned OFF.

The voltage of the bases of the first and second transistors 503 and 504 which bases are connected to each other is raised and the first transistor 503 conducts.

When the first transistor 503 conducts, a current flows from the plus terminal of a first DC power source 501 to the common gates of the IGBTs 1 and 2 through the collector and emitter of the first transistor 503 and a resistor 506. The current charges the capacitor 250 and the static capacitances included in the IGBTs 1 and 2 in the direction from the common gate to the common emitter, thereby shifting the voltage 55 of the common gate with respect to the common emitter of the IGBTs 1 and 2 to a positive value. The voltage 55 is finally fixed to a value obtained by subtracting the ON voltage of the output transistor of the first photocoupler 510, the base-emitter voltage of the first transistor 503, and the voltage drops of resistors 508 and 506 from the plus voltage of the first DC power source 501.

The value to which the voltage 55 is finally fixed must be set so that the IGBT 1 sufficiently conducts, the IGBT 2 is sufficiently turned OFF and the value does not exceed the withstand voltage across the gate and the emitter of each of the IGBTs 1 and 2. The DC power source 501, the transistor 503, the resistors 506 and 508 and the photocoupler 510 are designed so as to satisfy these conditions.

When the switching control signal 42 is in 'L' level, the input light emitting device of the first photocoupler 510 is caused not to be lit by the control signal 43, and the output transistor of the photocoupler is turned OFF. The input light emitting device of the second photocoupler 520 is caused to be lit by the control signal 45, and the output transistor of the photocoupler is turned ON.

Consequently, the voltage of the bases of the first and second transistors 503 and 504 which bases are connected to each other is lowered and the second transistor 504 conducts.

When the second transistor 504 conducts, a current flows from the common gates of the IGBTs 1 and 2 to the minus terminal of a second DC power source 502 through the collector and emitter of the second transistor 504 and a resistor 507. The current charges the capacitor 250 and the static capacitances included in the IGBTs 1 and 2 in the direction from the common emitter to the common gate, thereby shifting the voltage 55 of the common gate with respect to the common emitter of the IGBTs 1 and 2 to a negative value. The voltage 55 is finally fixed to a value obtained by adding the ON voltage of the output transistor of the second photocoupler 520, the base-emitter voltage of the second transistor 504 and the voltage drops of resistors 509 and 507 to the minus voltage of the second DC power source 502.

The value to which the voltage 55 is finally fixed must be set so that the IGBT 1 is sufficiently turned OFF, the IGBT 2 sufficiently conducts, and the value does not exceed the withstand voltage across the gate and the emitter of each of the IGBTs 1 and 2. The DC power source 502, the transistor 504, the resistors 507 and 509 and the photocoupler 520 are designed so as to satisfy these conditions.

From the above description, it will be seen that the input electrode control circuit shown in FIG. 3 can control the voltage 55 of the common gate with respect to the common emitter of the first and second IGBTs 1 and 2 to be a positive or negative value in accordance with the ON or OFF states of the output transistors of the first and second photocouplers 510 and 520.

When the first and second photocouplers 510 and 520 perform the ON/OFF switching in accordance with the control signals 43 and 45, the photocouplers 510 and 520 are caused to be simultaneously turned ON for a moment by the delay of the OFF operation of the photocouplers 510 and 520, thereby producing a possibility that a short circuit current may flow from the plus terminal of the first DC power source 501 to the minus terminal of the second DC power source 502. The resistors 508 and 509 are disposed in order to prevent such a short circuit current from being excessively increased.

If the first and second photocouplers 510 and 520 meet specifications that the transistors must endure the above-mentioned short circuit current, however, the resistors 508 and 509 may be omitted after their terminals are short-circuited.

The resistor 508 may be disposed on the side of the collector of the output transistor of the first photocoupler 510. The resistor 509 may be disposed on the side of the emitter of the output transistor of the second photocoupler 520.

When the ON and OFF states of the first and second transistors 503 and 504 are switched over by the ON/OFF switching of the photocouplers 510 and 520, the transistors 503 and 504 become simultaneously ON state for a moment by the delay of the OFF operation of the transistors 503 and 504, thereby producing a possibility that a short circuit current may flow from the plus terminal of the first DC power source 501 to the minus terminal of the second DC power source 502. The resistors 506 and 507 are disposed in order to prevent such a short circuit current from being excessively increased.

If the first and second transistors 503 and 504 meet specifications that the transistors must endure the above-mentioned short circuit current, however, the resistors 506 and 507 may be omitted after their terminals are short-circuited.

In order to prevent the short circuit current from flowing, the resistor 506 may be disposed on the side of the collector of the first transistor 503, and the resistor 507 may be disposed on the side of the collector of the second transistor 504.

The resistors 506 and 507 have a function of, when the static capacitances included in the IGBTs 1 and 2 and the like and the capacitor 250 are charged, preventing the charging current from being excessively increased, thereby protecting the components of the input electrode control circuit 500.

As the resistors 506 and 507 have a smaller value, the charging current can be made larger in level so that the voltage 55 of the gates with respect to the emitters of the IGBTs 1 and 2 is rapidly changed to a positive or negative value. As a result, the conduction states of the IGBTs 1 and 2 can be instantaneously switched over, thereby producing an advantage that the power loss can be reduced. In this case, however, there arises a disadvantage that an electric noise level is raised. In the use in which the electric noise level is to be low, therefore, it is required to slowly change the voltage 55. This requirement can be satisfied by setting the values of the resistors 506 and 507 to be large.

In order to lower the electric noise level, a resistor may be inserted into the path in which the above-mentioned charging current is generated. For example, the output circuit may be configured in such a manner that the resistors 506 and 507 are omitted, the emitters of the first and second transistors 503 and 504 are connected to each other, and a resistor is connected between the common emitter and the common gate of the IGBTs 1 and 2.

In this case, transistors which are produced so as to meet specifications that the transistors must endure the above-mentioned short circuit current must be used as the first and second transistors 503 and 504.

A resistor 260 is disposed so as to serve as a load resistance in the case where each of the first and second transistors 503 and 504 conducts, and used for stabilizing the conduction operation of each of the transistors 503 and 504.

Next, the case where the motor release signal 156 is in 'L' level or instructs the motor to be the free running state will be described.

In this case, the input light emitting devices of the first and second photocouplers 510 and 520 are caused not to be lit by the control signals 43 and 45, and the output transistors of the photocouplers are turned OFF.

First, the case will be considered where, when the voltage 55 of the common gate with respect to the common emitter of the IGBTs 1 and 2 has a positive value (a voltage at which the IGBT 1 can be sufficiently turned ON and which does not exceed the withstand voltage of the IGBT 1, for example, about +7 to +10 V), both the output transistors of the photocouplers 510 and 520 are turned OFF.

In this case, in the second transistor 504 which is of the PNP type, the base is negative with respect to the emitter and the base current flows via a resistor 505, thereby attaining the conduction state.

When the second transistor 504 is in the conduction state, a current is generated through a route from the common gate of the IGBTs 1 and 2 to the resistor 507 and the emitter and the collector of the transistor 504.

This current is due to discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously lowered to the vicinity of 0 V.

More correctly, the gate voltage is lowered to a level at which the second transistor 504 does not conduct. The value of the voltage corresponds to a threshold voltage across the base and emitter of the second transistor 504, and is about +0.7 V.

This voltage has a value which is lower than a gate threshold voltage (for example, about +2 V) of the N-channel IGBT 1, or sufficiently lower than a value at which the IGBT 1 is turned OFF. At the voltage, also the P-channel IGBT 2 can be simultaneously turned OFF.

Next, the case will be considered where, when the voltage 55 of the common gate with respect to the common emitter of the IGBTs 1 and 2 has a negative value (a voltage at which the IGBT 2 can be sufficiently turned ON and which does not exceed the withstand voltage of the IGBT, for example, about −7 to −10 V), both the output transistors of the photocouplers 510 and 520 are turned OFF.

In this case, in the first transistor 503 which is of the NPN type, the base is positive with respect to the emitter, and the base current flows via the resistor 505, thereby attaining the conduction state.

When the first transistor 503 is in the conduction state, a current is generated through a route from the collector and the emitter of the transistor 503 and the resistor 506 to the common gate of the IGBTs 1 and 2.

This current is due to discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously raised to the vicinity of 0 V.

More correctly, the voltage 55 is raised to a level at which the first transistor 503 does not conduct. The value of the voltage corresponds to a threshold voltage across the base and emitter of the first transistor 503, and is about −0.7 V.

This voltage has a value which is higher than a gate threshold voltage (for example, about −2 V) of the P-channel IGBT 2, or sufficiently higher than a value at which the IGBT 2 is turned OFF. At the voltage, also the N-channel IGBT 1 can be simultaneously turned OFF.

From the above description, it will be seen that, when both the input lighting elements of the first and second photocouplers 510 and 520 are not lit, the input electrode control circuit 500 shown in FIG. 3 controls the voltage 55 of the common gate with respect to the common emitter of the first and second IGBTs 1 and 2 so as to instantaneously become approximately 0 V, whereby the conduction states of the IGBTs 1 and 2 which are the power devices can be instantaneously interrupted.

The resistors 506 and 507 have a function of, when charges accumulated in the static capacitances included in the IGBTs 1 and 2 and the like and the capacitor 250 are discharged, preventing the discharging current from being excessively increased, thereby protecting the components of the input electrode control circuit 500.

In order to suppress the above-mentioned discharging current, a resistor may be inserted into the path in which the discharging current is generated. For example, the output circuit may be configured in such a manner that the resistors 506 and 507 are omitted, the emitters of the first and second transistors 503 and 504 are connected to each other, and a resistor is connected between the common emitter and the common gate of the IGBTs 1 and 2.

In the above, a specific example of the configuration of the input electrode control circuit 500 has been described.

When the motor is set to be the free running state, a method may be employed in which the impedance of the output of the input electrode control circuit 500 is made high by, for example, turning OFF both the transistors 503 and 504, and a discharge resistor for discharging the charges which are accumulated in the static capacitances included in the IGBTs 1 and 2 and the capacitor 250 is connected between the gates and the emitters of the IGBTs 1 and 2, as the resistor 260. In this case, the discharging of the charges of the static capacitances takes a prolonged time period. When the free running state is to be set, therefore, the time period required for making the IGBTs 1 and 2 active is prolonged, thereby producing a fear that the IGBTs excessively generate heat and are beyond the safe operation region to be broken.

When devices of a larger current capacity are used for the power devices such as the IGBTs, particularly, also the input capacities of the power devices (for example, "Ciss" in the case of power MOS-FETs, and "Cies" in the case of IGBTs) are increased, so that the above-mentioned fear is more serious.

In other words, the method using a discharge resistor has a limitation in increasing of the output power of an output circuit for a PWM inverter.

According to the invention, the voltage difference between the common gate and the common emitter of the IGBTs 1 and 2 is controlled to instantaneously become approximately 0 V by the input electrode control circuit 500, thereby enabling IGBTs 1 and 2 to be instantaneously interrupted. Therefore, the configuration of the invention is free from the fear which is produced in the above-mentioned case of using the discharge resistor, and can be easily applied to the increase of the output power of the output circuit for the PWM inverter.

Next, another example of the configuration of the input electrode controlling circuit will be described.

Figure 4:
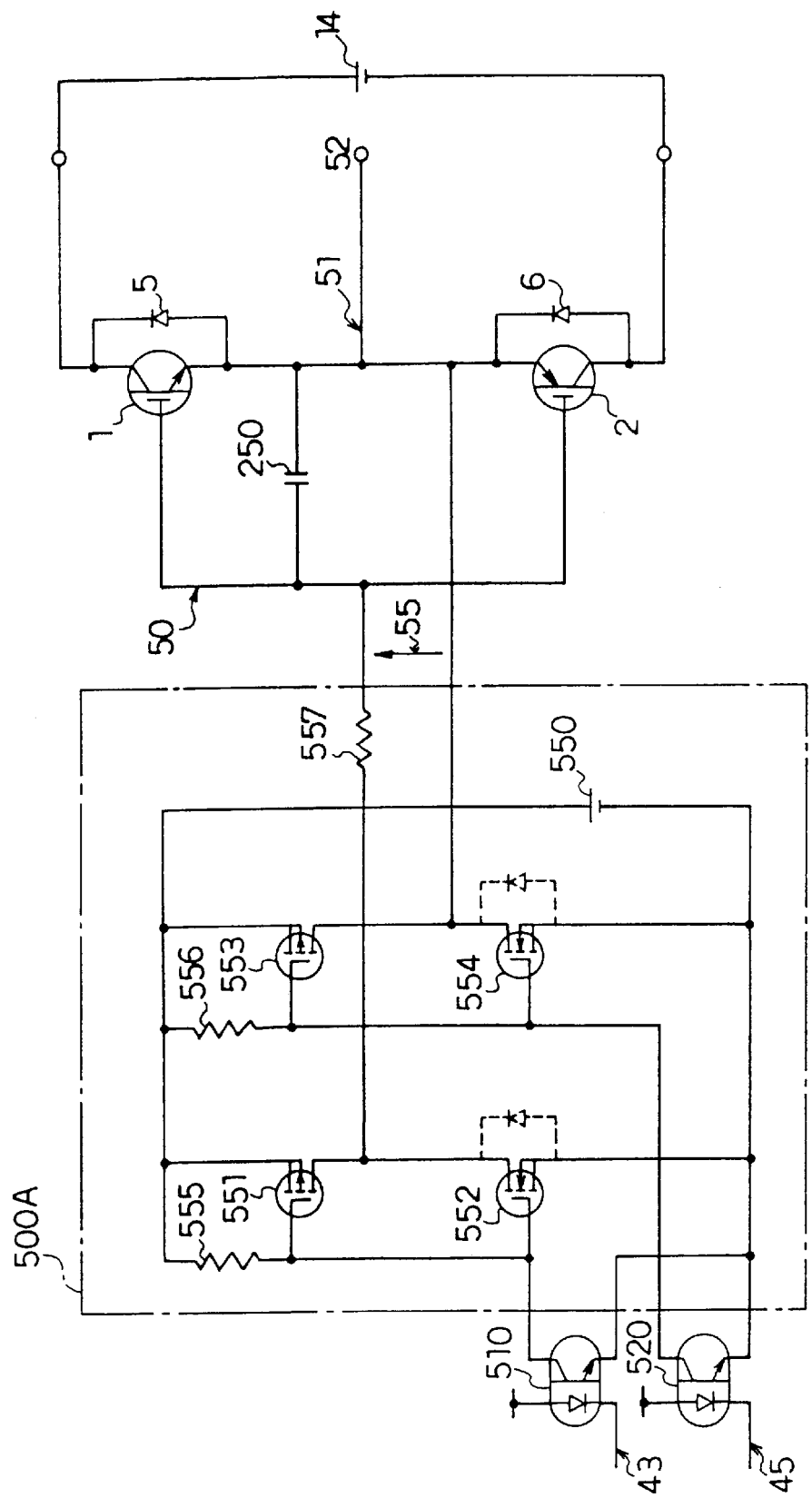
FIG. 4 is another circuit diagram of input electrode controlling circuit of the first embodiment of the invention.

FIG. 4 shows the configuration of an input electrode control circuit 500A.

Hereinafter, the input electrode control circuit 500A shown in FIG. 4 will be described.

First, the case where the motor release signal 156 is in 'H' level or instructs the motor not to be the free running state will be described.

In this case, when the switching control signal 42 is in 'H' level, the input light emitting device of the first photocoupler 510 is caused to be lit by the control signal 43, and the output transistor of the photocoupler is turned ON. The input light emitting device of the second photocoupler 520 is caused not to be lit by the control signal 45, and the output transistor of the photocoupler is turned OFF.

At this time, the gate voltage of a P-channel MOS-FET 551 which is the first switching means is lowered to a level which is equal to or higher than a threshold, and the MOS-FET 551 is turned ON. The gate voltage of an N-channel MOS-FET 552 which is the second switching means is lowered to a level which is equal to or lower than the threshold, and the MOS-FET 552 is turned OFF. The gate voltage of a P-channel MOS-FET 553 which is the third switching means is raised to a level which is equal to or lower than the threshold, and the MOS-FET 553 is turned OFF. The gate voltage of an N-channel MOS-FET 554 which is the fourth switching means is raised to a level which is equal to or higher than the threshold, and the MOS-FET 554 is turned ON.

Consequently, the plus terminal of a DC power source 550 is connected to the common gate of the IGBTs 1 and 2 via the source and drain of the MOS-FET 551 which is turned ON and a resistor 557. The minus terminal of the DC power source 550 is connected to the common emitter of the IGBTs 1 and 2 via the MOS-FET 554 which is turned ON. At this time, the current output from the DC power source 550 charges the capacitor 250 and the static capacitances included in the IGBTs 1 and 2 in the direction from the common gate to the common emitter, with the result that the voltage 55 of the common gate with respect to the common emitter of the IGBTs 1 and 2 is shifted to a positive value. The voltage 55 is finally fixed to a positive value obtained by subtracting the ON voltages of the MOS-FETs 551 and 554 from the output voltage of the DC power source 550.

The value to which the voltage 55 is finally fixed must be set so that the IGBT 1 sufficiently conducts, the IGBT 2 is sufficiently turned OFF, and the value does not exceed the withstand voltage across the gate and the emitter of each of the IGBTs 1 and 2. The DC power source 550, and the MOS-FETs 551 and 554 are designed so as to satisfy these conditions.

When the switching control signal 42 is in 'L' level, the input light emitting device of the first photocoupler 510 is caused not to be lit by the control signal 43, and the output transistor of the photocoupler is turned OFF. The input light emitting device of the second photocoupler 520 is caused to be lit by the control signal 45, and the output transistor of the photocoupler is turned ON.

At this time, the gate voltage of the P-channel MOS-FET 551 which is the first switching means is raised to a level which is equal to or lower than the threshold, and the MOS-FET 551 is turned OFF. The gate voltage of the N-channel MOS-FET 552 which is the second switching means is raised to a level which is equal to or higher than the threshold, and the MOS-FET 552 is turned ON. The gate voltage of the P-channel MOS-FET 553 which is the third switching means is lowered to a level which is equal to or higher than the threshold, and the MOS-FET 553 is turned ON. The gate voltage of the N-channel MOS-FET 554 which is the fourth switching means is lowered to a level which is equal to or lower than the threshold, and the MOS-FET 554 is turned OFF.

Consequently, the minus terminal of the DC power source 550 is connected to the common gate of the IGBTs 1 and 2 via the source and drain of the MOS-FET 552 which is turned ON and the resistor 557. The plus terminal of the DC power source 550 is connected to the common emitter of the IGBTs 1 and 2 via the MOS-FET 553 which is turned ON. At this time, the current output from the DC power source 550 charges the capacitor 250 and the static capacitances included in the IGBTs 1 and 2 in the direction from the common emitter to the common gate. As a result, the voltage 55 of the common gate with respect to the common emitter of the IGBTs 1 and 2 is shifted to a negative value. The voltage 55 is finally fixed to a negative value obtained by subtracting the ON voltages of the MOS-FETs 553 and 552 from the output voltage of the DC power source 550.

The value to which the voltage 55 is finally fixed must be set so that the IGBT 1 is sufficiently turned OFF, the IGBT 2 sufficiently conducts, and the value does not exceed the withstand voltage across the gate and the emitter of each of the IGBTs 1 and 2. The DC power source 550, and the MOS-FETs 552 and 553 are designed so as to satisfy these conditions.

From the above description, it will be seen that the input electrode control circuit 500A shown in FIG. 4 can control the voltage 55 of the common gate with respect to the common emitter of the IGBTs 1 and 2 to be a positive or negative value in accordance with the ON or OFF states of the output transistors of the first and second photocouplers 510 and 520.

The resistor 557 has a function of, when the static capacitances included in the IGBTs 1 and 2 and the like and the capacitor 250 are charged, preventing the charging current from being excessively increased, thereby protecting the components of the DC power source 550, MOS-FETs 551 to 554 and resistors 555 and 556 of the input electrode control circuit 500A.

As the resistor 557 has a smaller value, the above-mentioned charging current can be made larger in level. Therefore, the voltage 55 of the gates with respect to the emitters of the IGBTs 1 and 2 can be rapidly changed to a positive or negative value. In this case, the conduction states of the IGBTs 1 and 2 can be of instantaneously switched over, thereby producing an advantage that the power loss can be reduced. However, there arises a disadvantage that the electric noise level is raised. In the use in which the electric noise level is to be low, therefore, it is required to slowly change the voltage 55. This requirement can be satisfied by setting the value of the resistor 557 to be large.

In order to lower the electric noise level, a resistor may be inserted into the path in which the above-mentioned charging current is generated. For example, the output circuit may be configured in such a manner that the resistor 557 is omitted after its terminals are short-circuited, a resistor is connected to the drain or source of the MOS-FET 551, and a resistor is connected to the drain or source of the MOS-FET 552. Alternatively, a resistor may be connected to the drain or source of the MOS-FET 553, and a resistor may be connected to the drain or source of the MOS-FET 554.

In this case, even if the MOS-FETs 551 and 552 or the MOS-FETs 553 and 554 are caused to be simultaneously turned ON by any reason, there is no danger that the DC power source 550 is short-circuited, with the result that the circuit can have a safer configuration.

Alternatively, the output circuit may be configured in such a manner that the resistor 557 is omitted after its terminals are short-circuited, a resistor is connected to the drain or source of the MOS-FET 551, and a resistor is connected to the drain or source of the MOS-FET 553. Alternatively, a resistor may be connected to the drain or source of the MOS-FET 552, and a resistor may be connected to the drain or source of the MOS-FET 554.

In this case, even if all the MOS-FETs 551 to 554 are caused to be simultaneously turned ON by any reason, there is no danger that the DC power source 550 is short-circuited, with the result that the circuit can have a safer configuration.

Similarly, it is possible to configure the output circuit in such a manner that the resistor 557 is connected between the common drain of the MOS-FETs 553 and 554 and the common emitter of the IGBTs 1 and 2.

Next, the case where the motor release signal 156 is in 'L' level or instructs the motor to be the free running state will be described.

In this case, both the input light emitting devices of the first and second photocouplers 510 and 520 are caused not to be lit by the control signals 43 and 45, and the output transistors of the photocouplers are turned OFF.

First, the case will be considered where, when the voltage 55 of the common gate with respect to the common emitter of the IGBTs 1 and 2 has a positive value (a voltage at which the IGBT 1 can be sufficiently turned ON and which does not exceed the withstand voltage of the IGBT, for example, about +7 to +10 V), both the output transistors of the photocouplers 510 and 520 are turned OFF.

In this case, first and second resistors 555 and 556 allow the output voltage of the DC power source 550 to be applied to the gates of the MOS-FETs 552 and 554 as a bias signal. Therefore, both the gate voltages of the N-channel MOS-FETs 552 and 554 are equal to or higher than the threshold and the MOS-FETs are turned ON. At this time, both the gate voltages of the P-channel MOS-FETs 551 and 553 of which the gates are commonly connected to the respective MOS-FETs 552 and 554 are equal to or lower than the threshold, and the MOS-FETs 551 and 553 are turned OFF.

When both the MOS-FETs 552 and 554 are turned ON, a current flows in the path directed from the common gate of the IGBTs 1 and 2 to the common emitter of the IGBTs 1 and 2, via the resistor 557, and a diode (indicated by a broken line in FIG. 4) which usually parasitically exists across the drain and source of the MOS-FET 552 or that of the MOS-FET 554.

This current is due to the discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously lowered to the vicinity of 0 V.

More correctly, the voltage 55 is lowered to a level which is in the vicinity of the forward voltage of the diode parasitically existing in the MOS-FET 554, or about +0.7 V.

This voltage has a value which is lower than the gate threshold voltage (for example, about +2 V) of the N-channel IGBT 1, or sufficiently lower than a value at which the IGBT 1 is turned OFF. At the voltage, also the P-channel IGBT 2 can be simultaneously turned OFF.

Next, the case will be considered where, when the voltage 55 of the common gate with respect to the common emitter of the IGBTs 1 and 2 has a negative value (a voltage at which the IGBT 2 can be sufficiently turned ON and which does not exceed the withstand voltage of the IGBT 2, for example, about −7 to −10 V), both the photocouplers 510 and 520 are turned OFF.

In this case, in the same manner as the case where the voltage 55 has a positive value, both the MOS-FETs 552 and 554 are turned ON.

When both the MOS-FETs 552 and 554 are turned ON, a current flows in the path directed from the common emitter of the IGBTs 1 and 2 to the common gate of the IGBTs 1 and 2, via a diode (indicated by a broken line in FIG. 4) which usually parasitically exists across the drain and source of the MOS-FET 554 or that of the MOS-FET 552, and the resistor 557.

This current is due to the discharging of the charges which are accumulated in the static capacitances included in the IGBTs 1 and 2 and the capacitor 250. The flow of the discharging current causes the voltage 55 of the gates with respect to the emitters of the IGBTs 1 and 2, to be instantaneously raised to the vicinity of 0 V.

More correctly, the voltage 55 is raised to a level which is in the vicinity of the forward voltage of the diode parasitically existing in the MOS-FET 552, or about −0.7 V.

This voltage 55 has a value which is higher than the gate threshold voltage (for example, about −2 V) of the P-channel IGBT 2, or sufficiently higher than a value at which the IGBT 2 is turned OFF. At the voltage, also the N-channel IGBT 1 can be simultaneously turned OFF.

From the above description, it will be seen that, when both the input lighting elements of the first and second photocouplers 510 and 520 are not lit, the input electrode control circuit 500A shown in FIG. 4 can control the voltage 55 of the common gate with respect to the common emitter of the IGBTs 1 and 2 so as to instantaneously become approximately 0 V, whereby the conduction states of the IGBTs 1 and 2 which are the power devices can be instantaneously interrupted.

The resistor 557 has a function of, when charges accumulated in the static capacitances included in the IGBTs 1 and 2 and the like and the capacitor 250 are discharged, preventing the discharging current from being excessively increased, thereby protecting the components of the input electrode control circuit 500A.

In order to suppress the above-mentioned discharging current, a resistor may be inserted into the path in which the discharging current is generated. For example, the output circuit may be configured in such a manner that the resistor 557 is omitted after its terminals are short-circuited, and a resistor is connected to the drain or source of at least one of the MOS-FETs 552 and 554 which are turned ON.

In this case, even if the MOS-FETs 551 and 552 or the MOS-FETs 553 and 554 are caused to be simultaneously turned ON by any reason, there is no danger that the DC power source 550 is short-circuited, with the result that the circuit can have a safer configuration.

Similarly, it is possible to configure the circuit in such a manner that the resistor 557 is connected between the common drain of the MOS-FETs 553 and 554, and the common emitter of the IGBTs 1 and 2.

In the above, a specific example of the configuration of the input electrode controlling means has been described.

In the same manner as the configuration shown in FIG. 3, the voltage difference between the common gate and the common emitter of the IGBTs 1 and 2 is controlled to instantaneously become approximately 0 V by the input electrode control circuit 500A, thereby enabling IGBTs 1 and 2 to be instantaneously interrupted. Therefore, the configuration of the invention is free from the fear which is produced in the case of using power devices of a higher current capacity, and can be easily applied to the increase of the output power of an output circuit for a PWM inverter.

When the input electrode control circuit 500A is configured as shown in FIG. 4, moreover, a single power source can be used or only the DC power source 550 is required. As compared with the configuration (requiring the two DC power sources 501 and 502) shown in FIG. 3, the power source portion can be simplified, and the invention can be applied to a circuit which is economical and miniaturized.

[Second embodiment]

Figure 5:
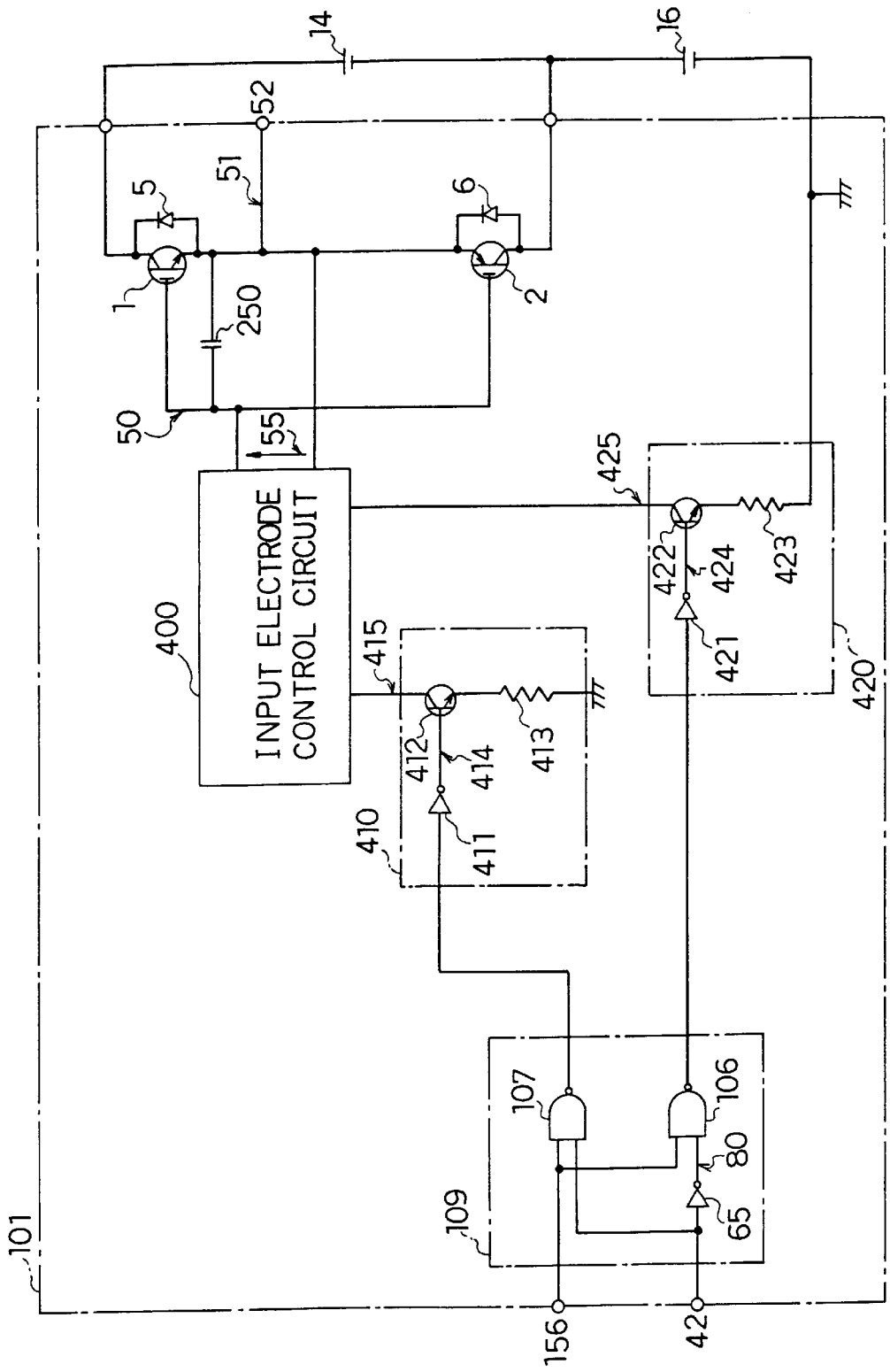
FIG. 5 is a diagram showing the configuration of an output circuit for a PWM inverter of a second embodiment of the invention.

FIG. 5 is a circuit diagram of an output circuit 101 for the PWM inverter which is a second embodiment of the invention.

Referring to FIG. 5, a first power device 1 which is of the N-type or the N-channel type, and a second power device 2 which is of the P-type or the P-channel type are configured by IGBTs, power MOS-FETs, or the like.

FIG. 5 shows the case where the first and second power devices 1 and 2 are IGBTs. In the following, the case where the power devices 1 and 2 are configured by IGBTs will be described.

The emitter which is the reference electrode of the first IGBT 1 and that which is the reference electrode of the second IGBT 2 are connected to each other. The gate which is the input electrode of the first IGBT 1 and that which is the input electrode of the second IGBT 2 are connected to each other.

Across the collectors which are the output electrodes of the first and second IGBTs 1 and 2 and the emitters which are the reference terminals, diodes 5 and 6 are connected in reverse parallel with respect to the conduction directions of the respective IGBTs.

One output terminal of an input electrode control circuit 400 is connected to the common gate of the first and second IGBTs 1 and 2, and the other output terminal is connected to the common emitter of the first and second IGBTs 1 and 2.

The outputs of first and second current generating circuits 410 and 420 are supplied to the input electrode control circuit 400.

The output of a signal processing circuit 109 is supplied to the first and second current generating circuits 410 and 420.

A capacitor 250 is connected between the common gate and the common emitter of the first and second IGBTs 1 and 2.

A main DC power source 14 and a DC power source 16 are connected to each other in series.

[Operation of the second embodiment]

Figure 6:
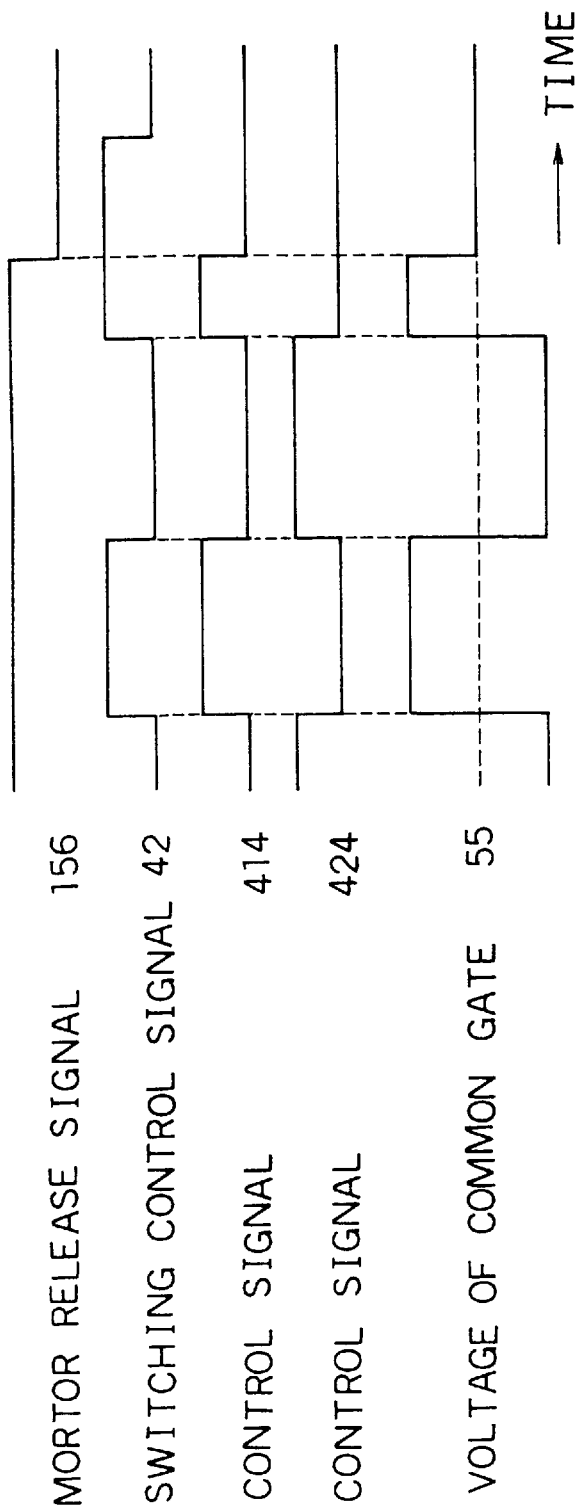
FIG. 6 is a view showing the operation of the output circuit for the PWM inverter of the second embodiment of the invention.

The operation of the thus configured output circuit for a PWM inverter will be described with reference to FIGS. 5 and 6.

A logic inverting circuit 65 inverts the logic of a switching control signal 42 and outputs the inversion result as an inverted switching signal 80.

A NAND circuit 106 outputs the NAND of a motor release signal 156 and the inverted switching signal 80. A NAND circuit 107 outputs the NAND of the motor release signal 156 and the switching control signal 42.

The logic inverting circuit 65, and the NAND circuits 106 and 107 constitute the signal processing circuit 109.

First, the case where the motor release signal 156 is in 'H' level or instructs the motor not to be the free running state will be described. Thereafter, the case where the motor release signal 156 is in 'L' level or instructs the motor to be the free running state will be described.

A control signal 414 for controlling the base of a transistor 412 which constitutes the first current generating circuit 410 is generated by passing the switching control signal 42 through the NAND circuit 107 and a logic inverting circuit 411. The control signal 414 is approximately identical with the switching control signal 42. For example, 'L' level of the signal is 0 V and 'H' level is 5 V.

The transistor 412 is incorporated in an emitter follower circuit configuration. When the control signal 414 is equal to or higher than about 0.7 V, the transistor 412 permits to flow a collector current 415 which is determined by the voltage of the control signal 414 and the value of a resistor 413 connected to the emitter. When the control signal 414 has a value which is lower than about 0.7 V, the collector current 415 is zero.

The relationships between the switching control signal 42 and the collector current 415 which is the output current of the first current generating circuit 410 will be summarized. When the switching control signal 42 is in 'L' level, the collector current 415 is zero. When the switching control signal 42 then becomes 'H' level, the collector current 415 is generated. When the switching control signal 42 again becomes 'L' level, the collector current 415 is zero.

A control signal 424 for controlling the base of a transistor 422 which constitutes the second current generating circuit 420 is generated by passing the switching control signal 42 through the logic inverting circuit 65, the NAND circuit 106, and a logic inverting circuit 421. The control signal 424 is approximately identical with the inversion of the switching control signal 42. For example, 'L' level of the signal is 0 V and 'H' level is 5 V.

The transistor 422 is incorporated in an emitter follower circuit configuration. When the control signal 424 is equal to or higher than about 0.7 V, the transistor 422 permits to flow a collector current 425 which is determined by the voltage of the control signal 424 and the value of a resistor 423 connected to the emitter. When the control signal 424 has a value which is lower than about 0.7 V, the collector current 425 is zero.

The relationships between the switching control signal 42 and the collector current 425 which is the output current of the second current generating circuit 420 will be summarized. When the switching control signal 42 is in 'L' level, the collector current 425 is generated. When the switching control signal 42 then becomes 'H' level, the collector current 425 is zero. When the switching control signal 42 again becomes 'L' level, the collector current 425 is generated.

The input electrode control circuit 400 operates so as to control the voltage 55 of the common gate with respect to the common emitter of the first and second IGBTs 1 and 2 in accordance with the states of the output currents of the first and second current generating circuits 410 and 420.

In other words, when the output current of the first current generating circuit 410 is generated and that of the second current generating circuit 420 is zero, the voltage 55 of the common gate with respect to the common emitter of the IGBTs 1 and 2 is controlled so as to have a positive value. When the output current of the first current generating circuit 410 is zero and that of the second current generating circuit 420 is generated, the voltage 55 of the common gate with respect to the common emitter of the IGBTs 1 and 2 is controlled so as to have a negative value.

The operations of the portions ranging from the switching control signal 42 to the input electrode control circuit 400 will be summarized. When the switching control signal 42 is in 'H' level, the output current of the first current generating circuit 410 is generated, that of the second current generating circuit 420 is zero, and the voltage 55 of the common gate with respect to the common emitter of the IGBTs 1 and 2 has a positive value.

When the switching control signal 42 is in 'L' level, the output current of the first current generating circuit 410 is zero, that of the second current generating circuit 420 is generated, and the voltage 55 of the common gate with respect to the common emitter of the IGBTs 1 and 2 has a negative value.

In this way, the voltage 55 of the common gate with respect to the common emitter of the IGBTS 1 and 2 is controlled in accordance with the switching control signal 42.

The positive value of the voltage 55 of the common gate with respect to the common emitter of the IGBTs 1 and 2 must be a voltage at which the first IGBT 1 can be sufficiently turned ON and the second IGBT 2 can be sufficiently turned OFF, and a value which does not exceed the withstand voltage across the gate and the emitter of each of the first and second IGBTs 1 and 2.

The negative value of the voltage 55 of the common gate with respect to the common emitter of the IGBTs 1 and 2 must be a voltage at which the second IGBT 2 can be sufficiently turned ON and the first IGBT 1 can be sufficiently turned OFF, and a value which does not exceed the withstand voltage across the gate and the emitter of each of the first and second IGBTs 1 and 2.

Usually, in many N-channel IGBTs, the withstand voltage across the gate and the emitter is about ±20 to ±30 V, and the gate threshold voltage at which the conduction state between the collector and the emitter is established is about +1 to +5 V with reference to the emitter voltage. In many P-channel IGBTs, the withstand voltage across the gate and the emitter is about ±20 to ±30 V, and the gate threshold voltage at which the conduction state between the collector and the emitter is established is about −1 to −5 V with reference to the emitter voltage.

Next, the operations of the first and second IGBT 1 and 2 will be described. The gates of the first and second IGBTs 1 and 2 are connected to each other and the emitters of the IGBTs are connected to each other. When the gate signal voltage 50 becomes higher than the motor winding terminal voltage 51 by a value which is equal to or larger than the gate threshold voltage of the first IGBT 1, therefore, the second IGBT 2 is turned OFF and a current begins to flow from the collector of the first IGBT 1 to the emitter. By contrast, when the gate signal voltage 50 becomes lower than the motor winding terminal voltage 51 by a value which is equal to or larger than the gate threshold voltage of the second IGBT 2, the first IGBT 1 is turned OFF and a current begins to flow from the emitter of the second IGBT 2 to the collector. Therefore, the short circuit state in which the first and second IGBTs 1 and 2 simultaneously allow a current to pass therethrough and the plus and minus terminals of the main DC power source 14 are short-circuited is intrinsically impossible.

A potential difference between the gate signal voltage 50 and the motor winding terminal voltage 51 is controlled as the voltage 55 by the input electrode control circuit 400. As described above, therefore, the potential difference is controlled so as to be within a fixed range where the IGBTs 1 and 2 can be turned ON/OFF safely and surely without exceeding the withstand voltage of the IGBTs.

Next, the operations of the diodes 5 and 6 will be described. Usually, a simple equivalent circuit (not shown) of a motor winding is represented by a series circuit of a resistor, an inductance, and a voltage source corresponding to the induced voltage. Unlike a pure resistance load, therefore, the direction of the current flowing through the motor winding terminal 52 is not uniquely determined by the voltage applied to the motor winding terminal 52. There are the following four states A, B, C, and D:

state A where the first IGBT 1 is turned ON, the second IGBT 2 is turned OFF, and the current flows from the motor winding terminal 52 to the motor;

state B where the first IGBT 1 is turned ON, the second IGBT 2 is turned OFF, and the current flows from the motor to the motor winding terminal 52;

state C where the first IGBT 1 is turned OFF, the second IGBT 2 is turned ON, and the current flows from the motor to the motor winding terminal 52; and state D where the first IGBT 1 is turned OFF, the second IGBT 2 is turned ON, and the current flows from the motor winding terminal 52 to the motor.

In the state A, it will be seen that the current flowing through the motor winding terminal 52 passes through the first IGBT 1. In the state C, it will be seen that the current flowing through the motor winding terminal 52 passes through the second IGBT 2. In the states B and D, it will be seen that the current flowing through the motor winding terminal 52 passes through the diode 5 or 6. The motor winding terminal voltage 51 in the state B is raised by the current flowing through the motor winding terminal 52 and fixed at the timing when the diode 5 conducts. When the reverse recovery time trr of the diode 5 is long, the switching loss is increased. Therefore, it is preferable to select a diode having a short reverse recovery time as the diode 5. Similarly, the motor winding terminal voltage 51 in the state D is lowered by the current flowing through the motor winding terminal 52 and fixed at the timing when the diode 6 conducts. When the reverse recovery time trr of the diode 6 is long, the switching loss is increased. Therefore, it is preferable to select as the diode 6 a diode having a reverse recovery time as short as possible.

From the above description, it will be seen that, when the switching control signal 42 is in 'H' level, the motor winding terminal 52 is connected to the plus terminal of the main DC power source 14. By contrast, when the switching control signal 42 is in 'L' level, the motor winding terminal 52 is connected to the minus terminal of the main DC power source 14. Also when the switching control signal 42 is changed from 'H' level to 'L' level or vice versa, therefore, the floating time period is intrinsically zero.

The rise and fall times of the motor winding terminal voltage 51 can be adjusted by connecting the capacitor 250 across the common gate and the common emitter of the first and second IGBTs 1 and 2 in FIG. 5.

As the rise and fall times of the motor winding terminal voltage 51 are shorter, usually, the power losses of the first and second IGBTs 1 and 2 and the like are reduced. Therefore, it is preferable to shorten the rise and fall times. However, this produces a drawback that electric noises are raised in level. Consequently, the use of the capacitor 250 is effective in the case where the rise and fall times of the motor winding terminal voltage 51 are particularly prolonged so that the electric noise level is lowered.

In the above, the description has been made as to the cases where the motor release signal 156 is in 'H' level or instructs the motor not to be the free running state. Next, description will be made as to the cases where the motor release signal 156 is in 'L' level or instructs the motor to be the free running state.

Referring to FIG. 5, when the motor release signal 156 is in 'L' level or instructs the motor to be the free running state, both the output signals of the NAND circuits 106 and 107 are in 'H' level irrespective of the switching control signal 42. Therefore, both the control signals 414 and 424 which respectively control the bases of the transistors 412 and 422 are in 'L' level.

As a result, both the output currents of the first and second current generating circuits 410 and 420 are zero.

The input electrode control circuit 400 is configured so as to, under this state, control the voltage 55 of the common gate with respect to the common emitter of the IGBTs 1 and 2 to have a value which is not higher than the gate threshold voltages of the IGBTs 1 and 2 or a value of approximately 0 V (for example, a voltage of about −1 to +1 V).

In order to set the voltage 55 across the common emitter and the common gate of the IGBTs 1 and 2 to be 0 V, the charges accumulated in the static capacitances included in the IGBTs 1 and 2 and the capacitor 250 must be discharged. To comply with this, the input electrode control circuit 400 is configured so as to discharge these charges for a very short time period.

When both the output currents of the first and second current generating circuits 410 and 420 become zero, therefore, the gate signal voltage 50 of the first and second IGBTs 1 and 2 instantaneously reaches a potential which is approximately equal to that of the motor winding terminal voltage 51. As a result, both the first and second IGBTs 1 and 2 are instantaneously turned OFF and the free running state is attained.

The free running state is used for interrupting the operation of the motor when any trouble occurs, thereby protecting the motor and the control apparatus.

Also in the case of an abnormal state of the power source such as a power failure, particularly, the motor and the control apparatus can be surely protected by configuring the circuit so that, when both the output currents of the first and second current generating circuits 410 and 420 are zero, the IGBTs 1 and 2 are interrupted.

When a power failure occurs, the voltage of the DC power source 16 which serves as a power source for operating the signal processing circuit 109 and the first and second current generating circuits 410 and 420 is rapidly lowered.

When the voltage of the DC power source 16 is lowered, the signal processing circuit 109 and the first and second current generating circuits 410 and 420 unstably operate. The output currents of the first and second current generating circuits 410 and 420, i.e., the collector currents 415 and 425 are surely reduced, with the reduction of the voltage of the DC power source 16 which is the power source, and then reaches zero.

The input electrode control circuit 400 is configured so that, when both the output currents of the first and second current generating circuits 410 and 420 become zero, the voltage of the common gate with respect to the common emitter of the IGBTs 1 and 2 is rapidly set to be approximately 0 V. When the input electrode control circuit 400 operates, therefore, the IGBTs 1 and 2 are instantaneously interrupted.

As mentioned above, when both the output currents of the first and second current generating circuits 410 and 420 are zero, the input electrode control circuit 400 sets the voltage 55 of the common gate with respect to the common emitter of the IGBTs 1 and 2 to be approximately 0 V. Therefore, the apparatus can be surely protected even in the case of a power failure in which the circuit portions unstably operate.

In the case where a three-phase motor is driven in such a manner that a current supply is performed during a period of 120 degrees. in electric angle and not performed during a period of 60 degrees, the free running state is used also for providing a current-supply halting phase in which a current supply to one predetermined phase is not performed.

Figure 7:
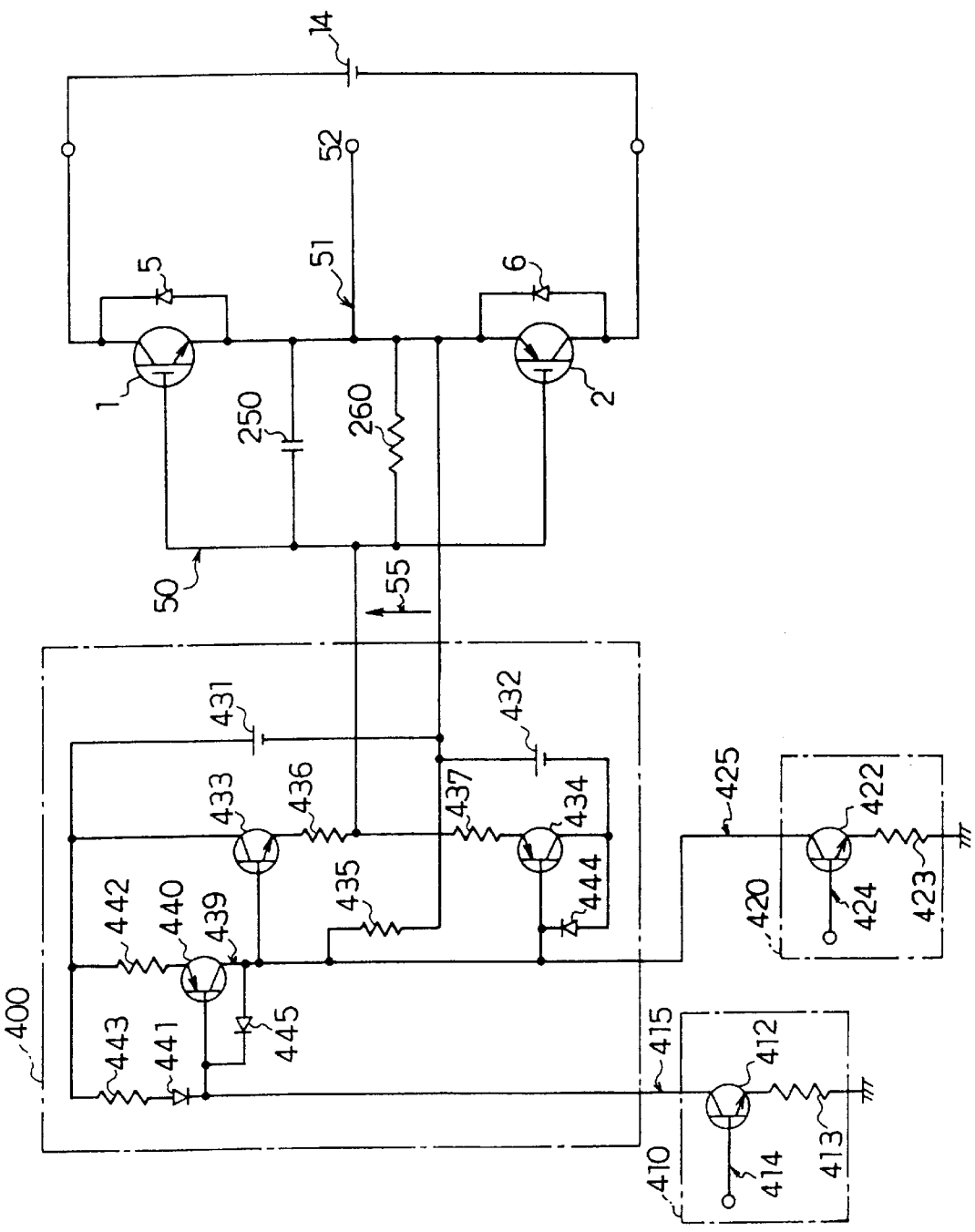
FIG. 7 is a circuit diagram of input electrode controlling means of the second embodiment of the invention.

FIG. 7 shows an example of the configuration of the input electrode control circuit 400.

Hereinafter, the input electrode control circuit 400 shown in FIG. 7 will be described.

First, description is made as to the case where the motor release signal 156 is in 'H' level or instructs the motor not to be the free running state.

In this case, when the switching control signal 42 turns to 'H' level, the transistor 412 is caused to conduct by the control signal 414, and the collector current 415 is generated as the output current of the first current generating circuit 410. As a result, a current mirror circuit configured by a transistor 440, a diode 441, and resistors 442 and 443 operates, and the transistor 440 generates a collector current 439 corresponding to the collector current 415. The transistor 422 is caused to be turned OFF by the control signal 424, and the collector current 425 which is the output current of the second current generating circuit 420 becomes zero.

Therefore, the voltage of the bases of the first and second transistors 433 and 434 which bases are connected to each other is raised, and the first transistor 433 conducts.

When the first transistor 433 conducts, a current flows from the plus terminal of a first DC power source 431 to the common gates of the IGBTs 1 and 2 through the collector and emitter of the first transistor 433 and a resistor 436. The current charges the capacitor 250 and the static capacitances included in the IGBTs 1 and 2 in the direction from the common gate to the common emitter, thereby shifting the voltage 55 of the common gate with respect to the common emitter of the IGBTs 1 and 2 to a positive value. The voltage 55 is finally fixed to a value obtained by subtracting the collector-emitter voltage of the transistor 440, the base-emitter voltage of the first transistor 433, and the voltage drops of the resistors 442 and 436 from the plus voltage of the first DC power source 431.

The value to which the voltage 55 is finally fixed must be set so that the IGBT 1 sufficiently conducts, the IGBT 2 is sufficiently turned OFF, and the value does not exceed the withstand voltage across the gate and the emitter of each of the IGBTs 1 and 2. The DC power source 431, the transistors 433 and 440, and the resistors 436 and 442 are designed so as to satisfy these conditions.

When the switching control signal 42 turns to 'L' level, the transistor 412 is caused to be turned OFF by the control signal 414, and the collector current 415 becomes zero, with the result that also the collector current 439 of the transistor 440 becomes zero. The transistor 422 is caused to conduct by the control signal 424, and the collector current 425 is generated.

Consequently, the voltage of the bases of the first and second transistors 433 and 434 which bases are connected to each other is lowered and the second transistor 434 becomes conductive.

When the second transistor 4343 conducts, a current flows from the common gates of the IGBTs 1 and 2 to the minus terminal of a second DC power source 432 through the collector and emitter of the second transistor 434 and a resistor 437. The current charges the capacitor 250 and the static capacitances included in the IGBTs 1 and 2 in the direction from the common emitter to the common gate, thereby shifting the voltage 55 of the common gate with respect to the common emitter of the IGBTs 1 and 2 to a negative value. The voltage 55 is finally fixed to a value obtained by subtracting the forward voltage of a diode 444 from the minus voltage of the second DC power source 432, and adding the base-emitter voltage of the second transistor 433, and the voltage drop of the resistor 437 to the subtraction result.

The value to which the voltage 55 is finally fixed must be set so that the IGBT 1 is sufficiently turned OFF, the IGBT 2 sufficiently conducts, and the value does not exceed the withstand voltage across the gate and the emitter of each of the IGBTs 1 and 2. The DC power source 432, the transistor 434, the resistor 437, and the diode 444 are designed so as to satisfy these conditions.

From the above description, it will be seen that the input electrode control circuit 400 shown in FIG. 7 can control the voltage 55 of the common gate with respect to the common emitter of the first and second IGBTs 1 and 2 to be a positive or negative value in accordance with the currents (the collector currents 415 and 425) generated by the first and second current generating circuits 410 and 420.

A diode 445 is disposed so as to prevent the transistor 440 from being excessively saturated in cases such as that where the collector current 415 is generated. Specifically, the diode 445 prevents the state from occurring in which the transistor 440 is saturated to be lowered in operation speed and the collector current 439 does not rapidly respond to the collector current 415 which is the output current of the current generating circuit 410.

The diode 444 is disposed so as to prevent the case from occurring where, in cases such as that where the collector current 425 is generated, the base voltage of the second transistor 434 is excessively lowered and the PN junction between the collector and the base of the transistor 434 is forward biased and the transistor 434 erroneously operates or is broken.

In order to realize the above-mentioned function, preferably, the diodes 444 and 445 are Schottky barrier diodes having a low forward voltage.

When the ON and OFF states of the first and second transistors 433 and 434 are switched over by the output currents of the current generating circuits 410 and 420, the transistors 433 and 434 become simultaneously conductive for a moment by the delay of the OFF operation of the transistors 433 and 434, thereby producing a fear that a short circuit current may flow from the plus terminal of the first DC power source 431 to the minus terminal of the second DC power source 432. The resistors 436 and 437 are disposed in order to prevent such a short circuit current from being excessively increased.

If the first and second transistors 433 and 434 meet specifications that the transistors must endure the above-mentioned short circuit current, however, the resistors 436 and 437 may be omitted after their terminals are short-circuited.

In order to prevent the short circuit current from flowing, the resistor 436 may be disposed on the side of the collector of the first transistor 433, and the resistor 437 may be disposed on the side of the collector of the second transistor 434.

The resistors 436 and 437 have a function of, when the static capacitances included in the IGBTs 1 and 2 and the like and the capacitor 250 are charged, preventing the charging current from being excessively increased, thereby protecting the components of the input electrode control circuit 400.

As the resistors 436 and 437 have a smaller value, the charging current can be made larger in level so that the voltage 55 of the gates with respect to the emitters of the IGBTs 1 and 2 is rapidly changed to a positive or negative value. In this case, the conduction states of the IGBTs 1 and 2 can be instantaneously switched over, thereby producing an advantage that the power loss can be reduced. However, there arises a disadvantage that the electric noise level is raised. In the use in which the electric noise level is to be low, therefore, it is required to slowly change the voltage 55. This requirement can be satisfied by setting the values of the resistors 436 and 437 to be large.

In order to lower the electric noise level, a resistor may be inserted into the path in which the above-mentioned charging current is generated. For example, the output circuit may be configured in such a manner that the resistors 436 and 437 are omitted, the emitters of the first and second transistors 433 and 434 are connected to each other, and a resistor is connected between the common emitter and the common gate of the IGBTs 1 and 2.

In this case, transistors which are produced so as to meet specifications that the transistors must endure the above-mentioned short circuit current must be used as the first and second transistors 433 and 434.

A resistor 260 is disposed so as to serve as a load resistance in the case where each of the first and second transistors 433 and 434 conducts, and used for stabilizing the conduction operation of each of the transistors.

Next, the case where the motor release signal 156 is in 'L' level or instructs the motor to be the free running state will be described.

In this case, both the transistors 412 and 422 are caused to be turned OFF by the control signals 414 and 424, respectively, and both the collector currents 415 and 425 become zero, with the result that also the collector current 439 of the transistor 440 becomes zero.

First, the case will be considered where, when the voltage 55 of the common gate with respect to the common emitter of the IGBTs 1 and 2 has a positive value (a voltage at which the IGBT 1 can be sufficiently turned ON and which does not exceed the withstand voltage of the IGBT, for example, about +7 to +10 V), both the collector currents 415 and 425 become zero.

In this case, in the second transistor 434 which is of the PNP type, the base is negative with respect to the emitter and the base current flows via a resistor 435, thereby attaining the conduction state.

When the second transistor 434 becomes conductive, a current is generated so as to flow through a path passing the common gate of the IGBTs 1 and 2, the resistor 437, and the emitter and the collector of the transistor 434.

This current is due to the discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously lowered to the vicinity of 0 V.

More correctly, the voltage 55 is lowered to a level at which the second transistor 434 does not conduct. The value corresponds to the threshold of the base-emitter voltage of the second transistor 434, and is about +0.7 V.

This voltage has a value which is lower than the gate threshold voltage (for example, about +2 V) of the N-channel IGBT 1, or sufficiently lower than a value at which the IGBT 1 is turned OFF. At the voltage, also the P-channel IGBT 2 can be simultaneously turned OFF.

Next, the case will be considered where, when the voltage 55 of the common gate with respect to the common emitter of the IGBTs 1 and 2 has a negative value (a voltage at which the IGBT 2 can be sufficiently turned ON and which does not exceed the withstand voltage of the IGBT, for example, about −7 to −10 V), both the collector currents 415 and 425 become zero.

In this case, in the first transistor 433 which is of the NPN type, the base is positive with respect to the emitter and the base current flows via the resistor 435, thereby attaining the conduction state.

When the first transistor 433 becomes conductive, a current is generated so as to flow through a path passing the common gate of the IGBTs 1 and 2, the collector and the emitter of the transistor 433, and the resistor 436.

This current is due to the discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously raised to the vicinity of 0 V.

More correctly, the voltage 55 is raised to a level at which the first transistor 433 does not conduct. The value corresponds to the threshold of the base-emitter voltage of the first transistor 433, and is about −0.7 V.

The voltage 55 has a value which is higher than the gate threshold voltage (for example, about −2 V) of the P-channel IGBT 2, or sufficiently higher than a value at which the IGBT 2 is turned OFF. At the voltage, also the N-channel IGBT 1 can be simultaneously turned OFF.

From the above description, it will be seen that, when both the currents (the collector currents 415 and 425) generated by the first and second current generating circuits 410 and 420 are zero, the input electrode control circuit 400 shown in FIG. 7 controls the voltage 55 of the common gate with respect to the common emitter of the first and second IGBTs 1 and 2 so as to instantaneously become approximately 0 V, whereby the IGBTs 1 and 2 which are the power devices can be instantaneously interrupted.

The resistors 436 and 437 have a function of, when charges accumulated in the static capacitances included in the IGBTs 1 and 2 and the like and the capacitor 250 are discharged, preventing the discharging current from being excessively increased, thereby protecting the components of the input electrode control circuit 400.

In order to suppress the above-mentioned discharging current, a resistor may be inserted into the path in which the discharging current is generated. For example, the output circuit may be configured in such a manner that the resistors 436 and 437 are omitted, the emitters of the first and second transistors 433 and 434 are connected to each other, and a resistor is connected between the common emitter and the common gate of the IGBTs 1 and 2.

In the above, a specific example of the configuration of the input electrode control circuit 400 has been described.

When the motor is set to be the free running state, a method may be employed in which the output impedance of the input electrode control circuit 400 is made high, instead, a resistor is connected between the gates and the emitters of the IGBTs 1 and 2. In this case, however, the discharging of the charges of the static capacitances included in the IGBTs 1 and 2 takes a prolonged time period. When the free running state is to be set, therefore, the time period required for making the IGBTs 1 and 2 active is prolonged, thereby producing a fear that the IGBTs excessively generate heat or are beyond the safe operation region to be broken.

When devices of a larger current capacity are used as the power devices such as the IGBTs, particularly, also the input capacities of the power devices (for example, Ciss in the case of power MOS-FETs, and Cies in the case of IGBTs) are increased, so that the above-mentioned fear is more serious.

In other words, the method in which a resistor is connected between the gates and the emitters of the IGBTs 1 and 2 so as to cope with the free running state has a limitation in increasing of the output power of an output circuit for a PWM inverter.

According to the invention, the voltage difference between the common gate and the common emitter of the IGBTs 1 and 2 is controlled to instantaneously become approximately 0 V by the input electrode control circuit 400, thereby enabling the IGBTs 1 and 2 to be instantaneously interrupted. Therefore, the configuration of the invention is free from the fear which is produced in the above-mentioned case of using the discharge resistor, and can be easily applied to the increase of the output power of the output circuit for the PWM inverter.

The output circuit is configured so that photocouplers which are easily affected by heat are not used, and the IGBTs 1 and 2 which are the power devices are controlled by the current generating circuits 410 and 420 configured by the transistors 412 and 422, etc. Therefore, the output circuit is hardly affected by heat and can be advantageously applied to the use in a wider temperature range.

Next, another example of the configuration of the input electrode controlling circuit 400 will be described.

Figure 8:
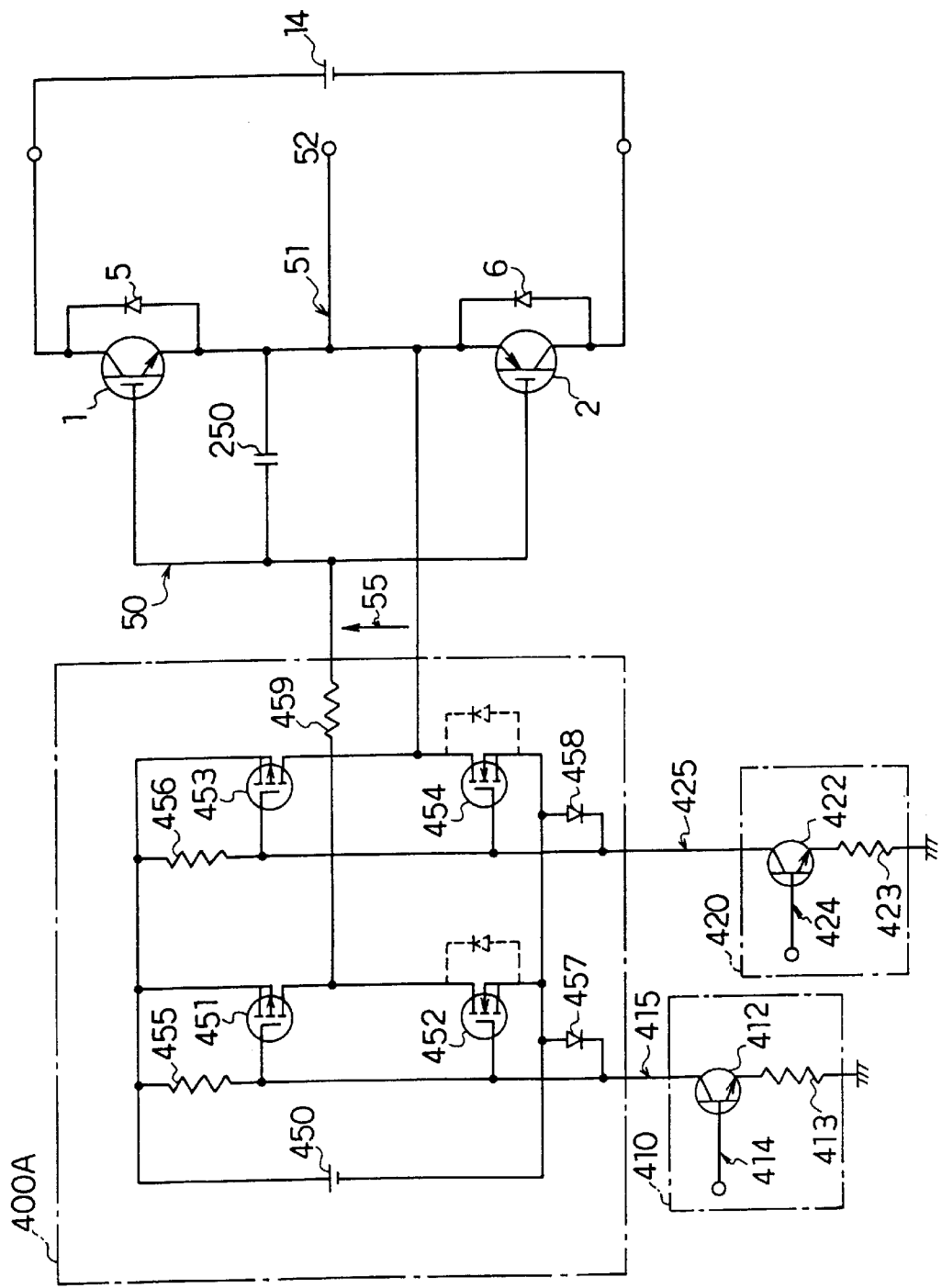
FIG. 8 is another circuit diagram of input electrode controlling means of the second embodiment of the invention.
Figure 9:
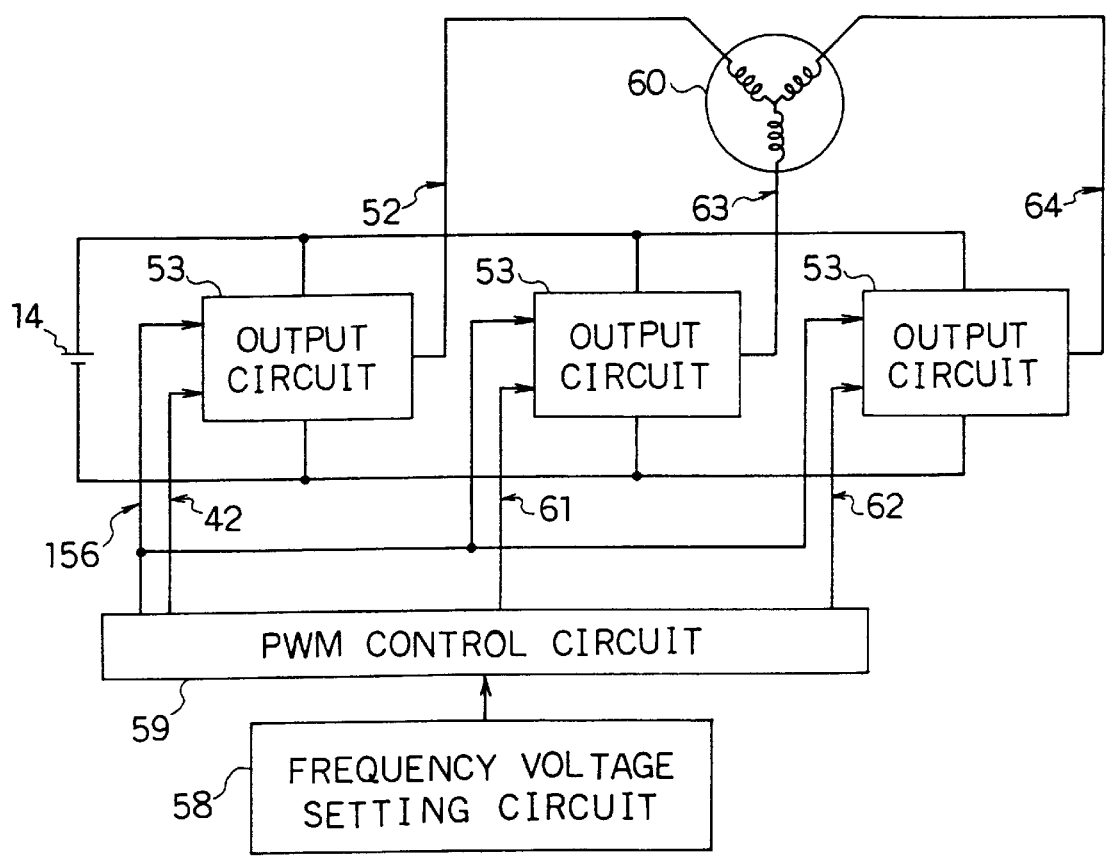
FIG. 9 is the block diagram showing the configuration of the usual output circuit for the PWM inverter.
Figure 10:
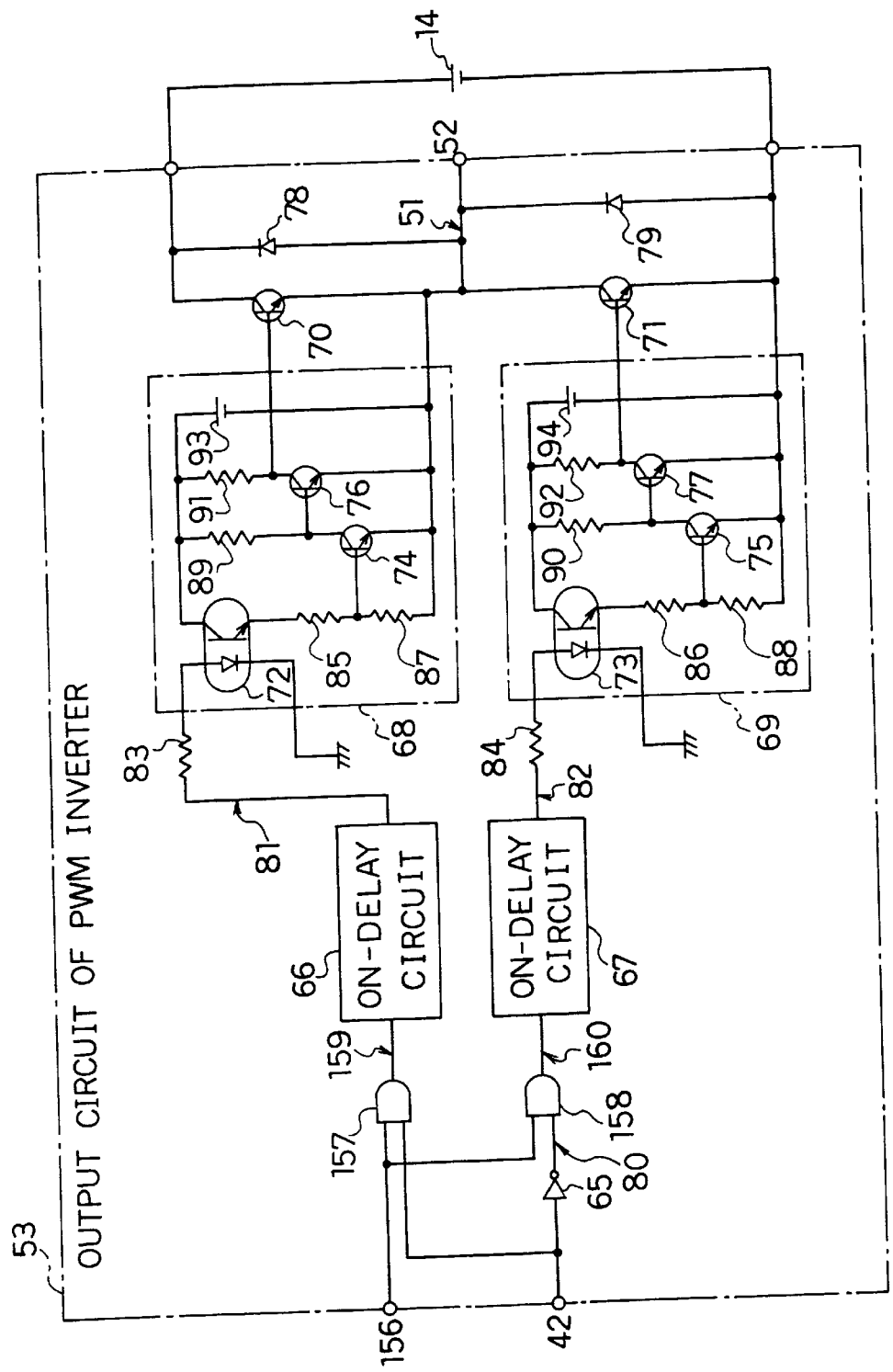
FIG. 10 is the block diagram showing the configuration of the conventional output circuit for the PWM inverter.
Figure 11:
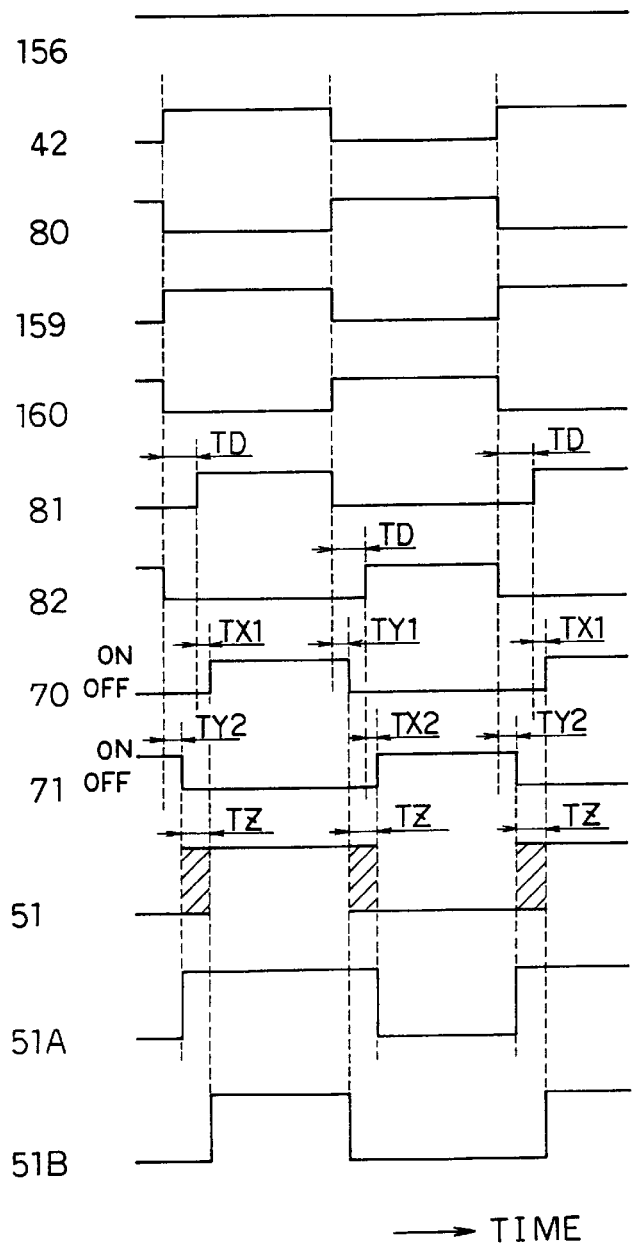
FIG. 11 is the timing chart showing the operation of the conventional output circuit for the PWM inverter.

FIG. 8 shows the configuration of an input electrode control circuit 400A.

Hereinafter, the input electrode control circuit 400A shown in FIG. 8 will be described.

First, the case where the motor release signal 156 is in 'H' level or instructs the motor not to be the free running state will be described.

In this case, when the switching control signal 42 is in 'H' level, the transistor 412 is caused to conduct by the control signal 414, and the collector current 415 is generated as the output current of the first current generating circuit 410. The transistor 422 is caused to be turned OFF by the control signal 424, and the collector current 425 which is the output current of the second current generating circuit 420 becomes zero.

At this time, the gate voltage of a P-channel MOS-FET 451 which is the first switching means is lowered to a level which is equal to or higher than the threshold and the MOS-FET 451 is turned ON, and the gate voltage of an N-channel MOS-FET 452 which is the second switching means is lowered to a level which is equal to or lower than the threshold and the MOS-FET 452 is turned OFF. The gate voltage of a P-channel MOS-FET 453 which is the third switching means is raised to a level which is equal to or lower than the threshold and the MOS-FET 453 is turned OFF, and the gate voltage of an N-channel MOS-FET 454 which is the fourth switching means is raised to a level which is equal to or higher than the threshold and the MOS-FET 454 is turned ON.

Consequently, the plus terminal of a DC power source 450 is connected to the common gate of the IGBTs 1 and 2 via the source and drain of the MOS-FET 451 which is turned ON and a resistor 459. The minus terminal of the DC power source 450 is connected to the common emitter of the IGBTs 1 and 2 via the MOS-FET 454 which is turned ON. At this time, the current output from the DC power source 450 charges the capacitor 250 and the static capacitances included in the IGBTs 1 and 2 in the direction from the common gate to the common emitter, with the result that the voltage 55 of the common gate with respect to the common emitter of the IGBTs 1 and 2 is shifted to a positive value. The voltage 55 is finally fixed to a positive value obtained by subtracting the ON voltages of the MOS-FETs 451 and 454 from the output voltage of the DC power source 450.

The value to which the voltage 55 is finally fixed must be set so that the IGBT 1 sufficiently conducts, the IGBT 2 is sufficiently turned OFF, and the value does not exceed the withstand voltage across the gate and the emitter of each of the IGBTs 1 and 2. The DC power source 450, and the MOS-FETs 451 and 454 are designed so as to satisfy these conditions.

When the switching control signal 42 is in 'L' level, the transistor 412 is caused to be turned OFF by the control signal 414, and the collector current 415 becomes zero. The transistor 422 is caused to conduct by the control signal 424, and the collector current 425 is generated.

At this time, the gate voltage of the P-channel MOS-FET 451 which is the first switching means is raised to a level which is equal to or lower than the threshold and the MOS-FET is turned OFF, and the gate voltage of the N-channel MOS-FET 452 which is the second switching means is raised to a level which is equal to or higher than the threshold and the MOS-FET is turned ON. The gate voltage of the P-channel MOS-FET 453 which is the third switching means is lowered to a level which is equal to or higher than the threshold and the MOS-FET is turned ON, and the gate voltage of the N-channel MOS-FET 454 which is the fourth switching means is lowered to a level which is equal to or lower than the threshold and the MOS-FET is turned OFF.

Consequently, the minus terminal of the DC power source 450 is connected to the common gate of the IGBTs 1 and 2 via the source and drain of the MOS-FET 452 which is turned ON and the resistor 459. The plus terminal of the DC power source 450 is connected to the common emitter of the IGBTs 1 and 2 via the MOS-FET 453 which is turned ON. At this time, the current output from the DC power source 450 charges the capacitor 250 and the static capacitances included in the IGBTs 1 and 2 in the direction from the common emitter to the common gate, with the result that the voltage 55 of the common gate with respect to the common emitter of the IGBTs 1 and 2 is shifted to a negative value. The voltage 55 is finally fixed to a negative value obtained by subtracting the ON voltages of the MOS-FETs 453 and 452 from the output voltage of the DC power source 450.

The value to which the voltage 55 is finally fixed must be set so that the IGBT 1 is sufficiently turned OFF, the IGBT 2 sufficiently conducts, and the value does not exceed the withstand voltage across the gate and the emitter of each of the IGBTs 1 and 2. The DC power source 450, and the MOS-FETs 452 and 453 are designed so as to satisfy these conditions.

From the above description, it will be seen that the input electrode control circuit 400A shown in FIG. 8 can control the voltage 55 of the common gate with respect to the common emitter of the first and second IGBTs 1 and 2 to be a positive or negative value in accordance with the currents (the collector currents 415 and 425) generated by the first and second current generating circuits 410 and 420.

A diode 457 is disposed to protect the MOS-FETs 451 and 452 so as to prevent the case from occurring where, in cases such as that where the collector current 415 is generated, the voltage of the common gate of the MOS-FETs 451 and 452 is excessively lowered and the gate voltage exceeds the withstand voltage and the MOS-FETs 451 and 452 are broken.

In the same manner as the diode 457, a diode 458 is disposed to protect the MOS-FETs 453 and 454 so as to prevent the case from occurring where the gate voltage exceeds the withstand voltage and the MOS-FETs are broken.

The resistor 459 has a function of, when the static capacitances included in the IGBTs 1 and 2 and the like and the capacitor 250 are charged, preventing the charging current from being excessively increased, thereby protecting the components of the DC power source 450, MOS-FETs 451 to 454, resisitors 455, 456 and 459, diodes 457 and 458 of the input electrode control circuit 400A.

As the resistor 459 has a smaller value, the above-mentioned charging current can be made larger in level. Therefore, the voltage 55 of the gates with respect to the emitters of the IGBTs 1 and 2 can be rapidly changed to a positive or negative value. In this case, the conduction states of the IGBTs 1 and 2 can be instantaneously switched over, thereby producing an advantage that the power loss can be reduced. However, there arises a disadvantage that the electric noise level is raised. In the use in which the electric noise level is to be low, therefore, it is required to slowly change the voltage 55. This requirement can be satisfied by setting the value of the resistor 459 to be large.

In order to lower the electric noise level, a resistor may be inserted into the path in which the above-mentioned charging current is generated. For example, the output circuit may be configured in such a manner that the resistor 459 is omitted after its terminals are short-circuited, a resistor is connected to the drain or source of the MOS-FET 451, and a resistor is connected to the drain or source of the MOS-FET 452. Alternatively, a resistor may be connected to the drain or source of the MOS-FET 453, and a resistor may be connected to the drain or source of the MOS-FET 454.

In this case, even if the MOS-FETs 451 and 452 or the MOS-FETs 453 and 454 are caused to be simultaneously turned ON by any reason, there is no danger that the DC power source 450 is short-circuited, with the result that the circuit can have a safer configuration.

Alternatively, the output circuit may be configured in such a manner that the resistor 459 is omitted after its terminals are short-circuited, a resistor is connected to the drain or source of the MOS-FET 451, and a resistor is connected to the drain or source of the MOS-FET 453. Alternatively, a resistor may be connected to the drain or source of the MOS-FET 452, and a resistor may be connected to the drain or source of the MOS-FET 454.

In this case, even if all the MOS-FETs 451 to 454 are caused to be simultaneously turned ON by any reason, there is no danger that the DC power source 450 is short-circuited, with the result that the circuit can have a safer configuration.

Similarly, it is possible to configure the output circuit in such a manner that the resistor 459 is connected between the common drain of the MOS-FETs 453 and 454, and the common emitter of the IGBTs 1 and 2.

Next, the case where the motor release signal 156 is in 'L' level or instructs the motor to be the free running state will be described.

In this case, both the transistors 412 and 422 are caused to be turned OFF by the control signals 414 and 424, respectively, and both the collector currents 415 and 425 become zero.

First, the case will be considered where, when the voltage 55 of the common gate with respect to the common emitter of the IGBTs 1 and 2 has a positive value (a voltage at which the IGBT 1 can be sufficiently turned ON and which does not exceed the withstand voltage of the IGBT, for example, about +7 to +10 V), both the collector currents 415 and 425 become zero.

In this case, first and second resistors 455 and 456 allow the output voltage of the DC power source 450 to be applied to the gates of the MOS-FETs 452 and 454 as a bias signal. Therefore, both the gate voltages of the N-channel MOS-FETs 452 and 454 are equal to or higher than the threshold and the MOS-FETs are turned ON. At this time, both the gate voltages of the P-channel MOS-FETs 451 and 453 of which the gates are commonly connected to the MOS-FETs 452 and 454, respectively, become equal to or lower than the threshold, and the MOS-FETs 451 and 453 are turned OFF.

When both the MOS-FETs 452 and 454 are turned ON, a current flows in the path directed from the common gate of the IGBTs 1 and 2 to the common emitter of the IGBTs 1 and 2, via the resistor 459, and a diode (indicated by a broken line in FIG. 8) which usually parasitically exists across the drain and source of the MOS-FET 452 or that of the MOS-FET 454.

This current is due to the discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously lowered to the vicinity of 0 V.

More correctly, the voltage 55 is lowered to a level which is in the vicinity of the forward voltage of the diode parasitically existing in the MOS-FET 454, or about +0.7 V.

This voltage has a value which is lower than the gate threshold voltage (for example, about +2 V) of the N-channel IGBT 1, or sufficiently lower than a value at which the IGBT 1 is turned OFF. At the voltage, also the P-channel IGBT 2 can be simultaneously turned OFF.

Next, the case will be considered where, when the voltage 55 of the common gate with respect to the common emitter of the IGBTs 1 and 2 is a negative value (a voltage at which the IGBT 2 can be sufficiently turned ON and which does not exceed the withstand voltage of the IGBT, for example, about −7 to −10 V), both the collector currents 415 and 425 become zero.

In this case, in the same manner as the case where the voltage 55 is a positive value, both the MOS-FETs 452 and 454 are turned ON.

When both the MOS-FETs 452 and 454 are turned ON, a current flows in the path directed from the common emitter of the IGBTs 1 and 2 to the common gate of the IGBTs 1 and 2, via a diode (indicated by a broken line in FIG. 8) which usually parasitically exists across the drain and source of the MOS-FET 454 or that of the MOS-FET 452, and the resistor 459.

This current is due to the discharging of the charges which are accumulated in the static capacitances included in the IGBTs 1 and 2 and the capacitor 250. The flow of the current causes the voltage 55 of the gates with respect to the emitters of the IGBTs 1 and 2, to be instantaneously raised to the vicinity of 0 V.

More correctly, the voltage 55 is raised to a level which is in the vicinity of the forward voltage of the diode parasitically existing in the MOS-FET 452, or about −0.7 V.

This voltage 55 has a value which is higher than the gate threshold voltage (for example, about −2 V) of the P-channel IGBT 2, or sufficiently higher than a value at which the IGBT 2 is turned OFF. At the voltage, also the N-channel IGBT 1 can be simultaneously turned OFF.

From the above description, it will be seen that, when both the currents (the collector currents 415 and 425) generated by the first and second current generating circuits 410 and 420 become zero, the input electrode control circuit 400A shown in FIG. 8 can control the voltage 55 of the common gate with respect to the common emitter of the IGBTs 1 and 2 so as to instantaneously become approximately 0 V, whereby the conduction states of the IGBTs 1 and 2 which are the power devices can be instantaneously interrupted.

The resistor 459 has a function of, when charges accumulated in the static capacitances included in the IGBTs 1 and 2 and the like and the capacitor 250 are discharged, preventing the discharging current from being excessively increased, thereby protecting the components of the input electrode control circuit 400A.

In order to suppress the above-mentioned discharging current, a resistor may be inserted into the path in which the discharging current is generated. For example, the circuit may be configured in such a manner that the resistor 459 is omitted after its terminals are short-circuited, and a resistor is connected to the drain or source of at least one of the MOS-FETs 452 and 454 which are turned ON.

In this case, even if the MOS-FETs 451 and 452 or the MOS-FETs 453 and 454 are caused to be simultaneously turned ON by any reason, there is no danger that the DC power source 450 is short-circuited, with the result that the circuit can have a safer configuration.

Similarly, it is possible to configure the circuit in such a manner that the resistor 459 is connected between the common drain of the MOS-FETs 453 and 454, and the common emitter of the IGBTs 1 and 2.

In the above, a specific example of the configuration of the input electrode controlling circuit 400A has been described.

In the same manner as the configuration shown in FIG. 7, the voltage difference between the common gate and the common emitter of the IGBTs 1 and 2 is controlled to instantaneously become approximately 0 V by the thus configured input electrode control circuit 400A, thereby enabling IGBTs 1 and 2 to be instantaneously interrupted. Therefore, the configuration of the invention is free from the fear of excessive heat generation or breakage which is produced in the case of using power devices of a higher current capacity, and can be easily applied to the increase of the output power of an output circuit for a PWM inverter.

The output circuit is configured so that photocouplers which are easily affected by heat are not used, and the IGBTs 1 and 2 which are the power devices are controlled by the current generating circuits 410 and 420 configured by the transistors 412 and 422, etc. Therefore, the output circuit is hardly affected by heat and can be advantageously applied to the use in a wider temperature range.

When the input electrode control circuit 400A is configured as shown in FIG. 8, moreover, a single power source can be used or only the DC power source 450 is required. As compared with the configuration (requiring the two DC power sources 431 and 432) shown in FIG. 7, the power source portion can be simplified, and the invention can be applied to a circuit which is economical and miniaturized.

In the invention, the output circuit may be configured so that the currents passing through the first and second power devices are detected and, when either of the detection currents is excessively increased to a level at which the corresponding power device is broken, the input electrode controlling circuit is rapidly operated so as to instantaneously interrupt the conduction state of the power device. According to this configuration, when the motor winding terminal 52 or the like is erroneously short-circuited, it is possible to protect the power devices from being broken, thereby protecting the motor and the control apparatus.

In the above-described embodiments of the invention, the IGBTs are used as the first and second power devices. It is a matter of course that an output circuit using power MOS-FETs is within the scope of the invention, and can attain the same effects.

In this case, if the diodes 5 and 6 for circulating currents, which are connected in parallel with the respective IGBTs, can be replaced with diodes which usually parasitically exist in the power MOS-FETs, the diodes 5 and 6 may be omitted.

With recent advances of the semiconductor technology, many power devices which are larger in current density than IGBTs and more suitable for the increase of the current capacity have been studied and practically used. An example of such power devices is an IEGT (Injection Enhancement Gate Transistor). In the invention, such novel power devices may be used as the power devices.

Today, semiconductor devices which use Si (silicon) as a basic material are widely used. Studies are conducted on semiconductor devices which use SiC (silicon carbide) as a basic material suitable for high current density, and, novel power devices which are produced from such a novel semiconductor material may be also used.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An output circuit for a PWM inverter comprising:

a main DC power source;

a first power device of an N-type having an input electrode, a reference electrode and an output electrode, wherein when said input electrode is positive in voltage with respect to said reference electrode, a conduction state between said output electrode and said reference electrode is established;

a second power device of a P-type having an input electrode, a reference electrode and an output electrode, wherein when said input electrode is negative in voltage with respect to said reference electrode, a conduction state between said output electrode and said reference electrode is established, and said input electrode of the second power device is connected to the input electrode of the first power device to form a common input electrode, and said reference electrode of the second power device is connected to the reference electrode of said first power device to form a common reference electrode;

input electrode controlling means having a first output terminal connected to said common input electrode and a second output terminal connected to said common reference electrode, the input electrode controlling means controlling a voltage of said first output terminal with respect to said second output terminal to be a positive or negative value, or to be approximately zero;

a first photocoupler having an input light emitting device; and a second photocoupler having an input light emitting device, wherein when said input light emitting device of said first photocoupler is in a lighting state and said input light emitting device of said second photocoupler is in a nonlighting state, said input electrode controlling means controls the voltage of said first output terminal with respect to said second output terminal to be a positive value, and controls the voltage of said common input electrode with respect to said common reference electrode of said first and second power devices to be said positive value, wherein when said input light emitting device of said first photocoupler is in a nonlighting state and said input light emitting device of said second photocoupler is in a lighting state, said input electrode controlling means controls the voltage of said first output terminal with respect to said second output terminal to be a negative value, and controls the voltage of said common input electrode with respect to said common reference electrode of said first and second power devices to be said negative value, wherein when said input light emitting device of said first photocoupler and said input light emitting device of said second photocoupler are both in a nonlighting state, said input electrode controlling means controls the voltage of said first output terminal with respect to said second output terminal to be approximately zero, and controls the voltage of said common input electrode with respect to said common reference electrode of said first and second power devices to be approximately zero, thereby interrupting the conduction state between said output electrode and said reference electrode of said first power device, and the conduction state between said output electrode and said reference electrode of said second power device.

2. An output circuit for a PWM inverter in accordance with claim 1, wherein said input electrode controlling means comprises:

a first DC power source having a minus terminal connected to said common reference electrode of said first and second power devices;

a second DC power source having a plus terminal connected to said common reference electrode of said first and second power devices;

a first transistor of an NPN type having a base terminal being controlled by said first photocoupler, a collector being connected to a plus terminal of said first DC power source, and an emitter being connected to said common input electrode of said first and second power devices;

a second transistor of a PNP type having a base terminal being controlled by said second photocoupler, a collector being connected to a minus terminal of said second DC power source, and an emitter being connected to said common input electrode of said first and second power devices; and a resistor connected between a common base terminal and said common reference electrode of said first and second power devices, base terminals of said first and second transistors constituting said common base terminal.

3. An output circuit for a PWM inverter in accordance with claim 1, wherein said input electrode controlling means comprises:
a DC power source;
a first switching means connected between a plus terminal of said DC power source and said common input electrode of said first and second power devices;
a second switching means connected between a minus terminal of said DC power source and said common input electrode of said first and second power devices, the second switching means turning ON when said input light emitting device of said first photocoupler is in a lighting state and said first switching means is turned ON;
a third switching means connected between said plus terminal of said DC power source and said common reference electrode of said first and second power devices;
a fourth switching means connected between said minus terminal of said DC power source and said common reference electrode of said first and second power devices, the fourth switching means turning OFF when said input light emitting device of said second photocoupler is in a lighting state and said third switching means is turned ON;
a first resistor for supplying a bias signal to said second switching means so that when said input light emitting device of said first photocoupler is in a nonlighting state, said first switching means is turned OFF and said second switching means is turned ON; and
a second resistor for supplying a bias signal to said fourth switching means so that, when said input light emitting device of said second photocoupler is in a nonlighting state, said third switching means is turned OFF and said fourth switching means is turned ON.

4. An output circuit for a PWM inverter in accordance with claim 1, wherein said input electrode controlling means comprises:
a DC power source;
a first switching means connected between a plus terminal of said DC power source and said common input electrode of said first and second power devices;
a second switching means connected between a minus terminal of said DC power source and said common input electrode of said first and second power devices, said first and second switching means being configured so that when said input light emitting device of said first photocoupler is in a lighting state, said second switching means is turned ON and said first switching means is turned OFF;
a third switching means connected between said plus terminal of said DC power source and said common reference electrode of said first and second power devices;
a fourth switching means connected between said minus terminal of said DC power source and said common reference electrode of said first and second power devices, said third and fourth switching means being configured so that when said input light emitting device of said second photocoupler is in a lighting state, said fourth switching means is turned ON and said third switching means is turned OFF;
a first resistor for supplying a bias signal to said first switching means so that when said input light emitting device of said first photocoupler is in a nonlighting state, said second switching means is turned OFF and said first switching means is turned ON; and
a second resistor for supplying a bias signal to said third switching means so that, when said input light emitting device of said second photocoupler is in a nonlighting state, said fourth switching means is turned OFF and said third switching means is turned ON.

5. An output circuit for a PWM inverter comprising:
a main DC power source;
a first power device of an N-type having an input electrode, a reference electrode and an output electrode, wherein when said input electrode is positive in voltage with respect to said reference electrode, a conduction state between said output electrode and said reference electrode is established;
a second power device of a P-type having an input electrode, a reference electrode and an output electrode, wherein when said input electrode is negative in voltage with respect to said reference electrode, a conduction state between said output electrode and said reference electrode is established, and said input electrode of the second power device is connected to the input electrode of the first power device to form a common input electrode, and said reference electrode of the second power device is connected to the reference electrode of the first power device to form a common reference electrode;
input electrode controlling means having a first output terminal connected to said common input electrode and a second output terminal connected to said common reference electrode, the input electrode controlling means controlling a voltage of said first output terminal with respect to said second output terminal to be a positive or negative value, or to be approximately zero;
first current generating means; and
second current generating means,
wherein when said first current generating means generates a current and a current generated by said second current generating means is approximately zero, said input electrode controlling means controls the voltage of said first output terminal with respect to said second output terminal to be a positive value, and controls the voltage of said common input electrode with respect to said common reference electrode of said first and second power devices to be said positive value,
wherein when a current generated by said first current generating means is approximately zero and said second current generating means generates a current, said input electrode controlling means controls the voltage of said first output terminal with respect to said second output terminal to be a negative value, and controls the voltage of said common input electrode with respect to said common reference electrode of said first and second power devices to be said negative value,
wherein when currents respectively generated by said first and second current generating means are both approximately zero, said input electrode controlling means controls the voltage of said first output terminal with respect to said second output terminal to be approximately zero, and controls the voltage of said common input electrode with respect to said common reference electrode of said first and second power devices to be approximately zero, thereby interrupting the conduction state between said output electrode and said reference electrode of said first power device, and the conduction state between said output electrode and said reference electrode of said second power device.

6. An output circuit for a PWM inverter in accordance with claim 5, wherein said input electrode controlling means comprises:

a first DC power source having a minus terminal connected to said common reference electrode of said first and second power devices;

a second DC power source having a plus terminal connected to said common reference electrode of said first and second power devices;

a first transistor of an NPN type having a base terminal of said first transistor being controlled by said first current generating means, a collector being connected to a plus terminal of said first DC power source and an emitter of said transistor being connected to said common input electrode of said first and second power devices;

a second transistor of a PNP type having a base terminal of said second transistor being controlled by said second current generating means, a collector being connected to a minus terminal of said second DC power source and an emitter of said transistor being connected to said common input electrode of said first and second power devices; and a resistor connected between a common base terminal and said common reference electrode of said first and second power devices, base terminals of said first and second transistors constituting said common base terminal.

7. An output circuit for a PWM inverter in accordance with claim 5, wherein said input electrode controlling means comprises:

a DC power source;

a first switching means connected between a plus terminal of said DC power source and said common input electrode of said first and second power devices;

a second switching means connected between a minus terminal of said DC power source and said common input electrode of said first and second power devices, the second switching means turning OFF when said first current generating means generates a current and said first switching means is turned ON;

a third switching means connected between said plus terminal of said DC power source and said common reference electrode of said first and second power devices;

a fourth switching means connected between said minus terminal of said DC power source and said common reference electrode of said first and second power devices, the fourth switching means turning OFF when said second current generating means generates a current and said third switching means is turned ON;

a first resistor for supplying a bias signal to said second switching means so that when the current generated by said first current generating means is approximately zero, said first switching means is turned OFF and said second switching means is turned ON; and a second resistor for supplying a bias signal to said fourth switching means so that when the current generated by said second current generating means is approximately zero, said third switching means is turned OFF and said fourth switching means is turned ON.

8. An output circuit for a PWM inverter in accordance with claim 5, wherein said input electrode controlling means comprises:

a DC power source;

a first switching means connected between a plus terminal of said DC power source and said common input electrode of said first and second power devices;

a second switching means connected between a minus terminal of said DC power source and said common input electrode of said first and second power devices, said first and second switching means being configured so that when said first current generating means generates a current, said second switching means is turned ON and said first switching means is turned OFF;

a third switching means connected between said plus terminal of said DC power source and said common reference electrode of said first and second power devices;

a fourth switching means connected between said minus terminal of said DC power source and said common reference electrode of said first and second power devices, said third and fourth switching means being configured so that when said second current generating means generates a current, said fourth switching means is turned ON and said third switching means is turned OFF;

a first resistor for supplying a bias signal to said first switching means so that when the current generated by said first current generating means is approximately zero, said second switching means is turned OFF and said first switching means is turned ON; and a second resistor for supplying a bias signal to said third switching means so that when the current generated by said second current generating means is approximately zero, said fourth switching means is turned OFF and said third switching means is turned ON.

* * * * *